US012762443B2

(12) United States Patent
Matsumoto et al.

(10) Patent No.: US 12,762,443 B2
(45) Date of Patent: Oct. 13, 2026

(54) QUANTUM ENTANGLEMENT DEVICE

(71) Applicants: PUBLIC UNIVERSITY CORPORATION NAGOYA CITY UNIVERSITY, Aichi (JP); Takahiro Matsumoto, Aichi (JP)

(72) Inventors: Takahiro Matsumoto, Nagoya (JP); Akio Tokumitsu, Nagoya (JP)

(73) Assignee: Takahiro Matsumoto, Aichi (JP)

(*) Notice: Subject to any disclaimer, the term of this patent is extended or adjusted under 35 U.S.C. 154(b) by 761 days.

(21) Appl. No.: 18/027,004

(22) PCT Filed: Sep. 16, 2021

(86) PCT No.: PCT/JP2021/034130

§ 371 (c)(1),
(2) Date: Mar. 17, 2023

(87) PCT Pub. No.: WO2022/059735

PCT Pub. Date: Mar. 24, 2022

(65) Prior Publication Data

US 2024/0070501 A1 Feb. 29, 2024

(30) Foreign Application Priority Data

Sep. 18, 2020 (JP) ................................ 2020-157501

(51) Int. Cl.
*G06N 10/20* (2022.01)
*G06N 10/40* (2022.01)

(52) U.S. Cl.
CPC ............ *G06N 10/20* (2022.01); *G06N 10/40* (2022.01)

(58) Field of Classification Search
CPC .............................. G06N 10/20; G06N 10/40
USPC ...................................................... 705/7, 62
See application file for complete search history.

(56) References Cited

U.S. PATENT DOCUMENTS 5,285,078 A * 2/1994 Mimura ................ H10F 55/155 257/3
7,061,008 B2 6/2006 Clark et al.
7,180,645 B2 * 2/2007 Azuma .................. B82Y 10/00 359/107
2004/0244672 A1 12/2004 Clark et al.
2013/0121449 A1 * 5/2013 Popa-Simil ............ G21B 3/002 376/149

(Continued)

FOREIGN PATENT DOCUMENTS

CN 1449359 A 10/2003
CN 110267915 A 9/2019
CN 210155496 U 3/2020

(Continued)

OTHER PUBLICATIONS

International Search Report (ISR) (and English translation thereof) dated Dec. 14, 2021, issued in International Application No. PCT/JP2021/034130.

(Continued)

*Primary Examiner* — Abdallah A El-Hage Hassan
(74) *Attorney, Agent, or Firm* — Holtz, Holtz & Volek PC

(57) ABSTRACT

A quantum entanglement device includes a group-IV semiconductor, and a scissor-type quantum entanglement element that has at least one atom on a surface of the group-IV semiconductor and two hydrogen atoms or two deuterium atoms coupled to terminations of the atom.

17 Claims, 17 Drawing Sheets

(56) References Cited

U.S. PATENT DOCUMENTS

2018/0136347 A1* 5/2018 Lechaton ............... H10N 69/00

FOREIGN PATENT DOCUMENTS

| | | | | |
|---|---|---|---|---|
| JP | 05275743 A | * 10/1993 | | |
| JP | H05275743 A | 10/1993 | | |
| JP | H06132564 A | 5/1994 | | |
| JP | H10256225 A | 9/1998 | | |
| JP | 2007265924 A | 10/2007 | | |
| JP | 2011204906 A | 10/2011 | | |
| WO | WO-2025061464 A1 | * 3/2025 | ............ | G06N 10/40 |

OTHER PUBLICATIONS

Written Opinion (and English translation thereof) dated Dec. 14, 2021, issued in International Application No. PCT/JP2021/034130.

Audretsch, et al., "865 The Production of Entangled States", Entangled Systems: New Directions in Quantum Physics, pp. 157-158, Feb. 23, 2007.

Dennison, et al., "A Note on the Specific Heat of the Hydrogen Molecule", Proceedings of the Royal Society, Ser. A, vol. 115, Issue 771, Jul. 1, 1927.

Ding, et al., "Silicon Photonics for Quantum Communication", 2019 21st International Conference on Transparent Optical Networks (ICTON). Jul. 9, 2019. pp. 1-4.

Edamatsu, "Entanglement Generation: Devices and Applications", Proceedings of the IEICE General Conference 2010, Mar. 2, 2010. Electronics 1. pp. SS-4., SS-5.

Edamatsu, "Single Photon and Quantum Entangled Photon", Frontline in Physics, Kyoritsu Publishing, pp. 127-128, 2018, ISDN978-4-320-03539-3.

Haider, et al., "Controlled Coupling and Occupation of Silicon Atomic Quantum Dots at Room Temperature", Physical Review Letters. Jan. 30, 2009. 102. 046805. pp. 1-4.

Horodecki, et al., "Quantum Entanglement", Reviews of Modern Physics, vol. 81, Apr.-Jun. 2009.

Murota, et al., "Atomically Controlled Processing for Nitrogen Doping of Group IV Semiconductors", ICSICT2014. Oct. 28, 2014. pp. 1-4.

Skibinski, et al., "Finding Needles in Haystacks: Scanning Tunneling Microscopy Reveals the Complex Reactivity of Si(I00) Surfaces", Accounts of Chemical Research. Jun. 24, 2015. pp. 2159-2166.

Takeoka, et al., "4 Quantum Node Technology", Journal of the National Institute of Information and Communications Technology, 2017. vol. 63. No. 1. pp. 41-46.

Takesue, et al., "Entanglement Generation Using Silicon Wire Waveguide", NTT Technical Review, Dec. 2009, vol. 21. No. 12. pp. 32-35.

Walls, et al., "17.I Introduction", Quantum Optics, p. 347, Springer Berlin 1994.

Extended European Search Report (EESR) dated Oct. 10, 2024, issued in counterpart European Application No. 21960083.0.

Edamatsu, et al., "Entangled Photons: Generation, Observation, and Characterization", Japanese Journal of Applied Physics, [Online] vol. 46, (Nov. 6, 2007), p. 7175, Retrieved from the Internet: URL:https://iopscience.iop.org/article/10. 1143/JJAP.46.7175/pdf>.

Chinese Office Action (and an English language translation thereof) dated Mar. 31, 2026, issued in counterpart Chinese Application No. 202180076883.2.

* cited by examiner

Fig.3
(A)
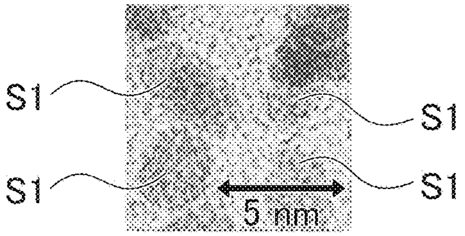
(B)
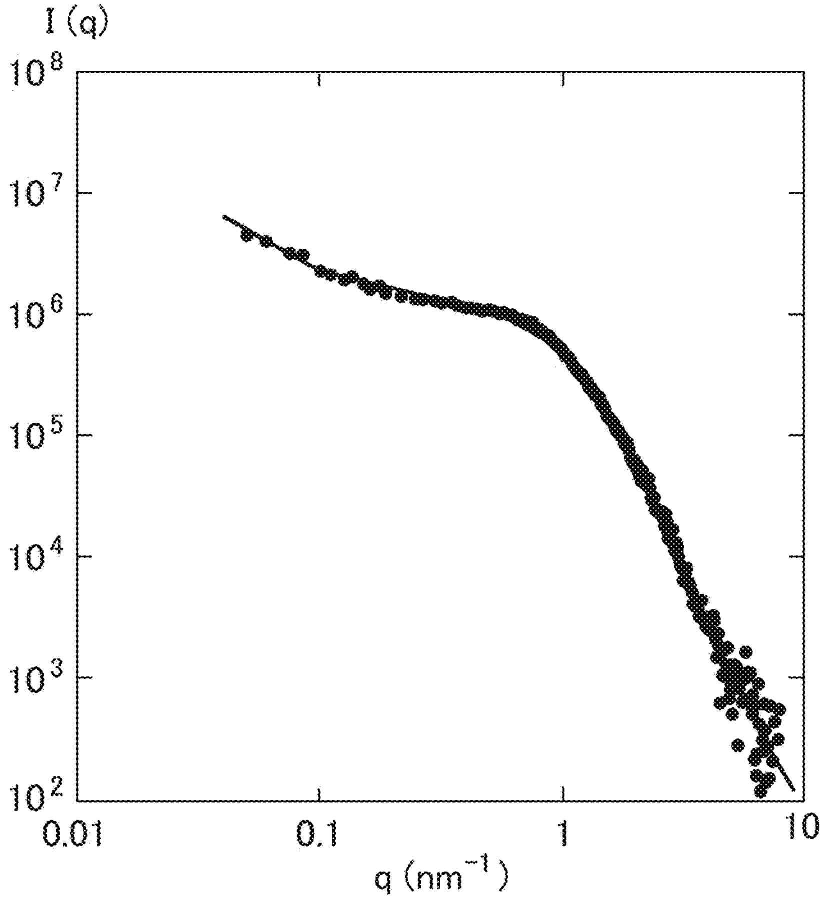
(C)
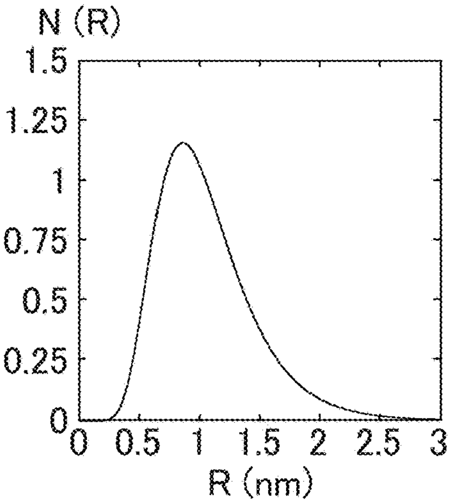

Fig.4
(A)
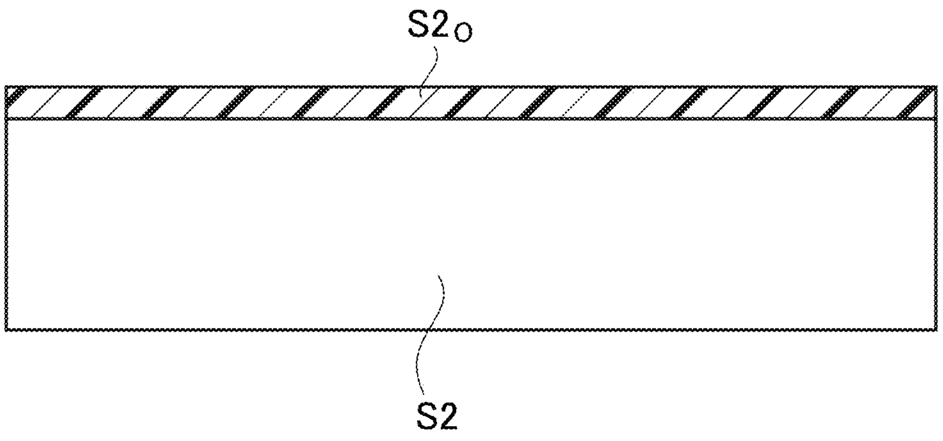
(B)
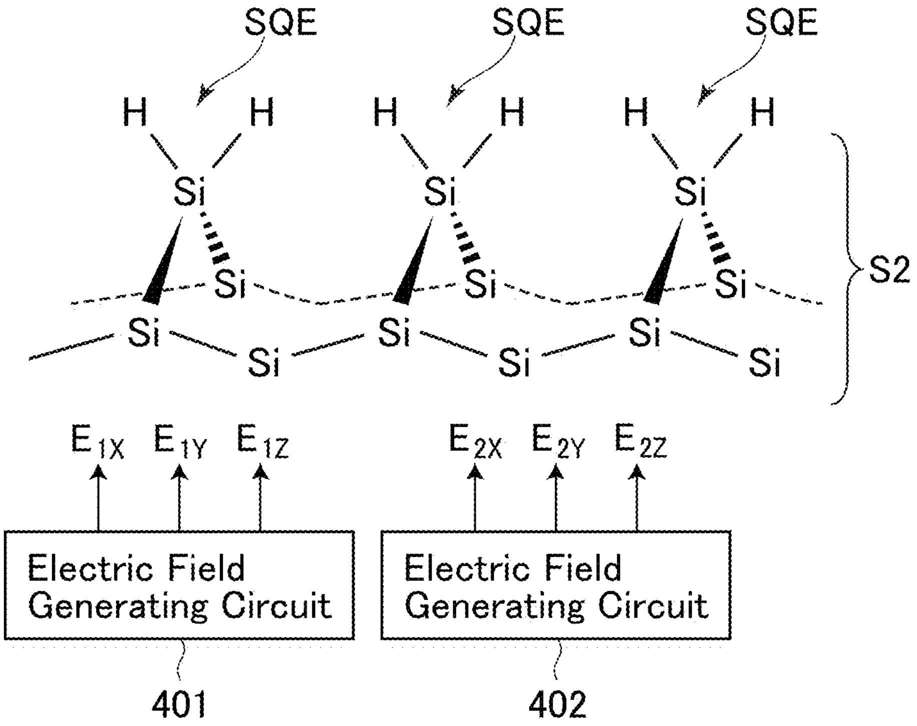

Fig.5

(A) Incoherent Scattering Cross-section $b_{\alpha\beta}$ In Singlet To Triplet Transition

| $\alpha$ \ $\beta$ | 1(Si) | 2(H) | 3(H) |
|---|---|---|---|
| 1(Si) | 0 | 0 | 0 |
| 2(H) | 0 | $\sigma_{inc}^{(H)}$ | $-\sigma_{inc}^{(H)}$ |
| 3(H) | 0 | $-\sigma_{inc}^{(H)}$ | $\sigma_{inc}^{(H)}$ |

(B) Coherent Scattering Cross-section $b_{\alpha\beta}$ In Singlet To Singlet Transition

| $\alpha$ \ $\beta$ | 1(Si) | 2(H) | 3(H) |
|---|---|---|---|
| 1(Si) | $\sigma_{coh}^{(Si)}$ | $-\sqrt{\sigma_{coh}^{(Si)}\sigma_{coh}^{(H)}}$ | $-\sqrt{\sigma_{coh}^{(Si)}\sigma_{coh}^{(H)}}$ |
| 2(H) | $-\sqrt{\sigma_{coh}^{(Si)}\sigma_{coh}^{(H)}}$ | $\sigma_{coh}^{(H)}$ | $\sigma_{coh}^{(H)}$ |
| 3(H) | $-\sqrt{\sigma_{coh}^{(Si)}\sigma_{coh}^{(H)}}$ | $\sigma_{coh}^{(H)}$ | $\sigma_{coh}^{(H)}$ |

Fig.8
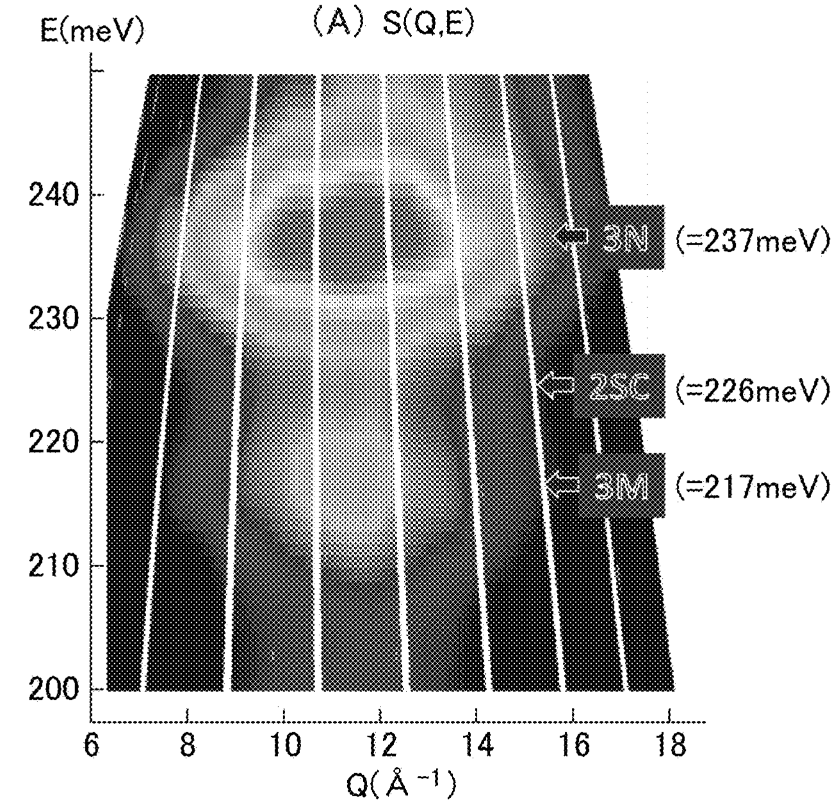
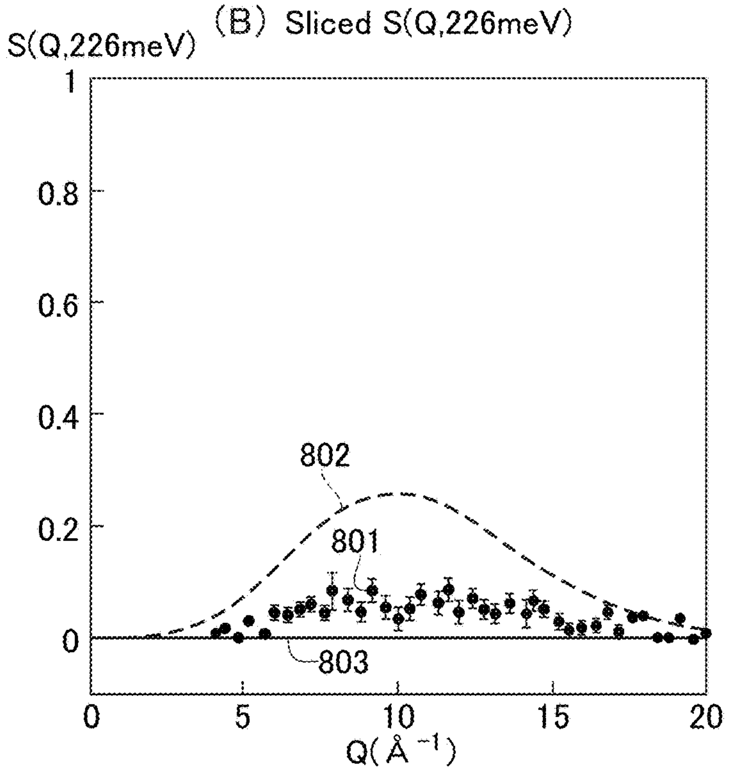

Fig.12
(A)
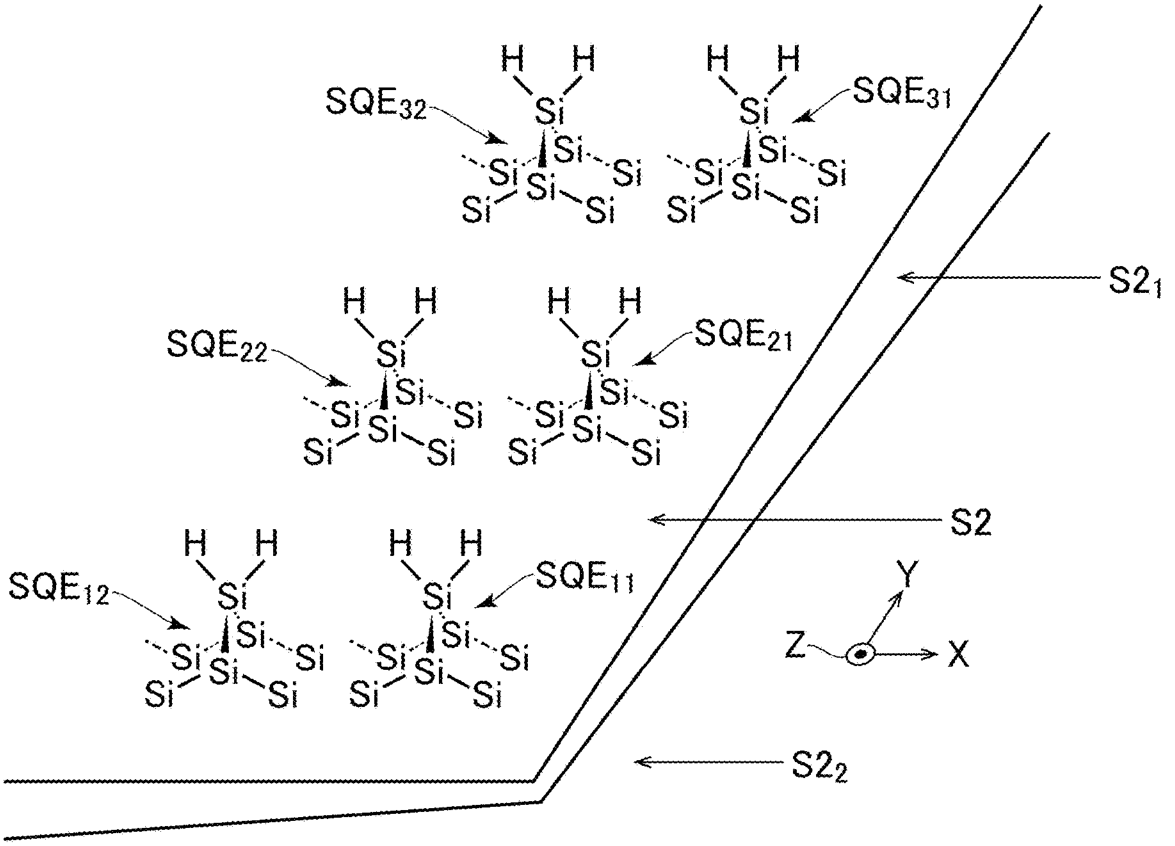
(B)
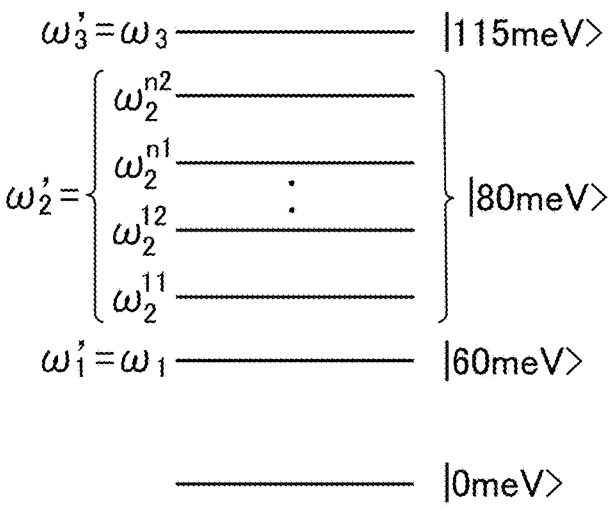
(C)
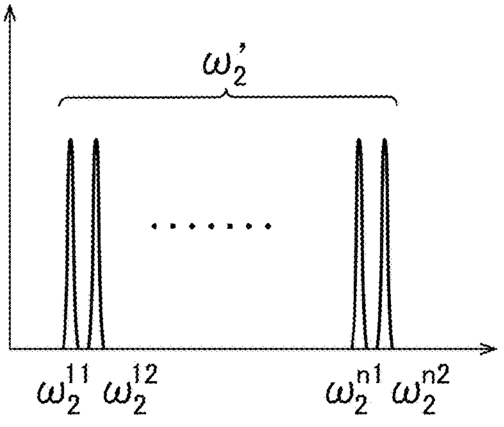

Fig.13
(A) $|1>_{12}|1>_{11}$
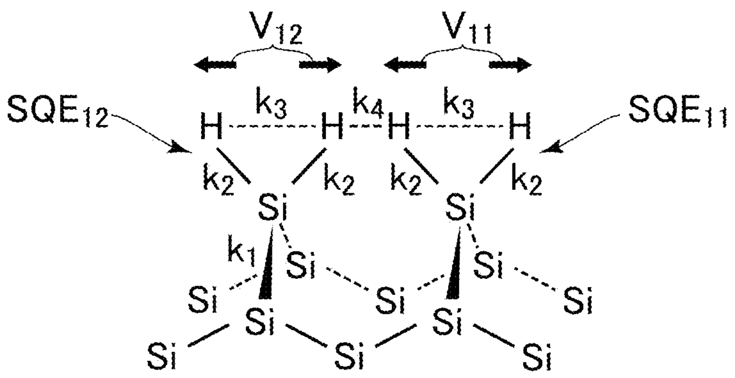
(B) $-|1>_{12}|1>_{11}$
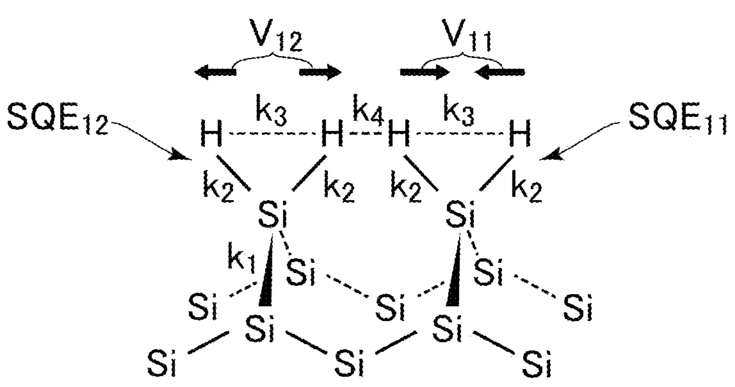

Fig.14
(A)
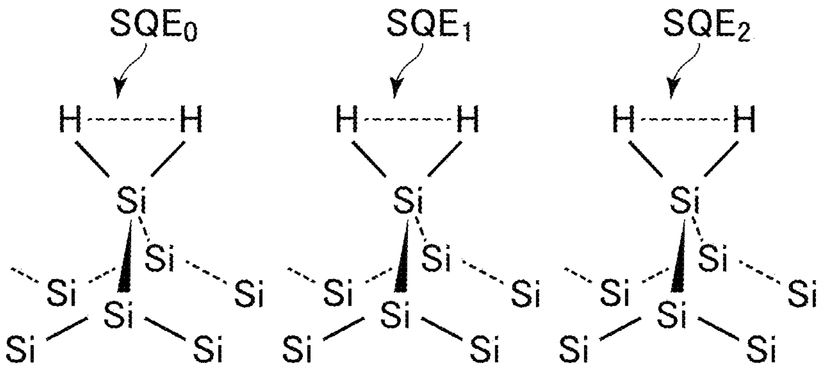
(B)
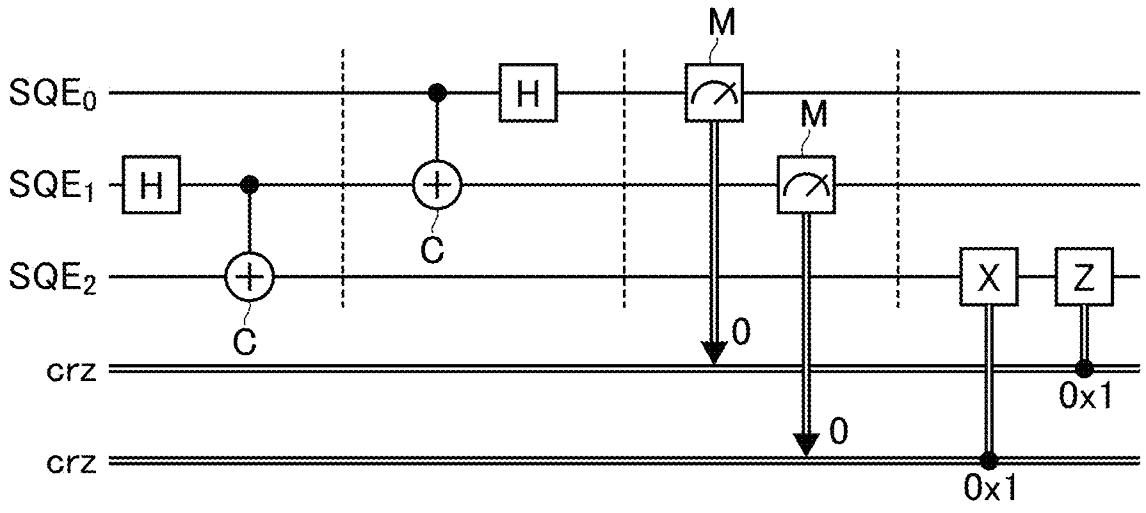

Fig.17
(A)
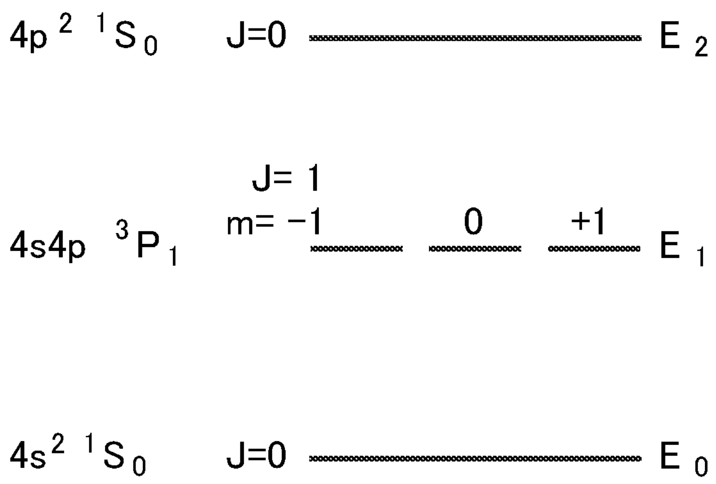
(B)
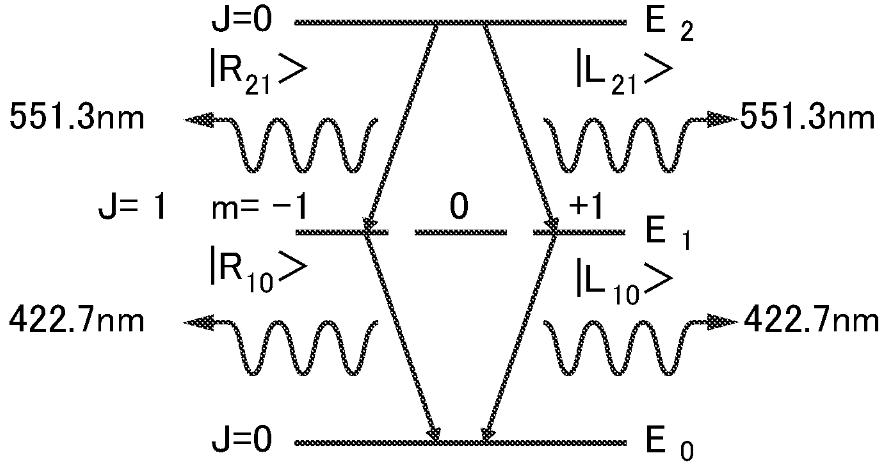

QUANTUM ENTANGLEMENT DEVICE

TECHNICAL FIELD

The present invention relates to a quantum entanglement device, and a quantum entangled photon pair generating device, a quantum entangled photon pair laser device, a quantum computer, a quantum communication device and quantum cryptography device using the quantum entanglement device.

BACKGROUND TECHNOLOGY

In a quantum computer, a quantum information technology, and a quantum-communication technology such as a quantum cryptography and a quantum teleportation, a quantum entanglement device is used to constitute a quantum entangled photon pair generating device and a quantum bit device.

A quantum entanglement state is a state which may appear in a case where multiple particles or states have a quantum mechanical correlation. As a quantum entangled state generating system, there are known a system using a circular polarization state of photons with spin 1, a system using a spin state of electrons and atoms with a spin 1/2, and a system using an ortho-state and a para-state of hydrogen molecules (see: Non-patent Literature 1). Thus, in order to realize a quantum entangled state, a stable spin control operation is required for a particle or a quantum state.

A prior art quantum entanglement device applies a high frequency voltage to a $^{40}$Ca atom at one point of space using a laser cooling method to electrically trap it, i.e., Paul-trap it, so that use is made of a three-level structured $^{40}$Ca atom cooled to the limit, thus generating an entangled photon pair with a wavelength of 551 nm and 423 nm (see: Non-patent Literatures 2, 3, 4 and 5).

FIG. 17 is a diagram for explaining a principle of generating a quantum entangled photon pair formed by a $^{40}$Ca atom in the above-mentioned prior art, where (A) is an energy level diagram and (B) is a diagram showing a cascade transition.

As illustrated in (A) of FIG. 17, $^{40}$Ca has a three-level structure formed by a singlet ground level $E_0$, a triplet intermediate level $E_1$ and a singlet excited level $E_2$. As a result, the singlet ground level $E_0$ and the singlet excited level $E_2$ have the same total angular momentum J=0 and the same spin angular momentum =0, the $^{40}$Ca atom excited at the singlet excited level $E_2$ is transited via the total angular momentum J=1 and the m=+1 or −1 states among the spin angular momentum m=+1, 0 and −1, so that cascade transitions $|R_{21}>$ and $|R_{10}>$ by the right-circulated polarizations and cascade transitions $|L_{21}>$ and $|L_{10}>$ by the left-circulated polarizations occur as illustrated in (B) of FIG. 17. The result is a quantum entangled photon pair represented by a quantum state $|\Psi>$ of Formula 1 where the above-mentioned transitions are not quantum-mechanically indistinguishable.

$$|\Psi>=\frac{1}{\sqrt{2}}(|R_{21}>|R_{10}>+|L_{21}>|L_{10}>) \qquad \text{[Formula 1]}$$

TECHNOLOGY LITERATURE

Non-Patent Literature

Non-Patent Literature 1: D. M. Dennison, A note on the specific heat of the hydrogen molecule, Proc. R. Soc. London, Ser. A 115, 483 (1927).

Non-Patent Literature 2: R. Horodecki, P. Horodecki, M. Horodecki, and K. Horodecki, Rev. Mod. Phys. 81, 865 (2009).

Non-Patent Literature 3: J. Audretsch, Entangled Systems: New Directions in Quantum Physics (Whiley—VCH, Weinheim, 2007).

Non-Patent Literature 4: D. F. Walls and G. J. Milburn, Quantum Optics (Springer, Berlin, 1994).

Non-Patent Literature 5: Keiichi Edamatsu, “Single Photon and Quantum Entangled Photon”, Kyoritsu Publisher, pp.127-128, 2018.

SUMMARY OF THE INVENTION

Problems to be Solved by the Invention

In the above-mentioned prior art quantum entangled device of FIG. 17, however, since use is made of the laser cooling method to apply a high frequency voltage at a special point to electrically trap a $^{40}$Ca atom, a stable spin control operation is carried out at an extremely low temperature.

Therefore, a cooling laser light source whose frequency is precisely controlled and an ultra vacuum unit are required, so that the manufacturing cost is very high, which is a problem. Also, it is difficult to arrange a lot of $^{40}$Ca atoms at desired positions, which is also a problem.

Also, in the above-mentioned prior art quantum entanglement device of FIG. 17, since wavelengths of generated light are in a visible light region whose wavelength is shorter than those of near-infrared (whose wavelength is 1 m), this device is not suitable for quantum information controlling light sources and light sources for communication where confidentiality is important, which is a further problem.

Means for Solving the Problems

In order to solve the above-mentioned problems, a quantum entanglement device according to the present invention comprises a group-IV semiconductor, and a scissor-type quantum entanglement element consisting of at least one atom on a surface of the group-IV semiconductor and two hydrogen atoms or two deuterium atoms coupled to terminations of the atom. The normal frequency of at least the atom on a surface of the group-IV semiconductor and two hydrogen atoms or two deuterium atoms coupled to terminations of the atom is described by a harmonic oscillator, and its spin state responds to a parity shown by the harmonic oscillator to become a symmetric spin state or an anti-symmetric spin state.

Also, a quantum entangled photon pair generating device comprises: the above-mentioned quantum entanglement device; and a pump light source for exciting the scissor-type quantum entanglement element, so that a photon pair generated from the scissor-type entanglement element can be in a quantum entangled state.

Also, a quantum entangled photon pair laser device comprises a group-IV semiconductor; multiple scissor-type quantum entanglement elements consisting of multiple atoms on a surface of the group-IV semiconductor and two hydrogen atoms or two deuterium atoms coupled to terminations of each of the atoms; and a pump light source for exciting the multiple scissor-type entanglement elements entirely, the multiple scissor-type quantum entanglement elements being arranged in close proximity to each other, so that a photon pair is stimulatively emitted.

Further, a quantum computer comprises a group-IV semiconductor; and multiple scissor-type quantum entanglement elements consisting of multiple atoms on a surface of the group-IV semiconductor and two hydrogen atoms or two deuterium atoms coupled to terminations of each of the atoms, so that a unitary operation is carried out among the multiple scissor-type quantum entanglement elements.

Further, a quantum communication device or a quantum cryptography device comprises a group-IV semiconductor; and multiple scissor-type quantum entanglement elements consisting of multiple atoms on a surface of the group-IV semiconductor and two hydrogen atoms or two deuterium atoms coupled to terminations of each of the atoms, so that a Bell measurement is carried out among the multiple scissor-type quantum entanglement elements ($SQE_0$, $SQE_1$), causing a quantum teleportation or a quantum entangled swapping.

Effect of the Invention

According to the present invention, use is made of a quantum entanglement formed in the scissor-type quantum entanglement element. Since a hydride termination process for the group-IV semiconductor and its surface can be carried out by the conventional semiconductor manufacturing steps, the manufacturing cost can be reduced. Also, the quantum entanglement device can be applied to a quantum information controlling light source and a light source for communication.

BRIEF DESCRIPTION OF THE DRAWINGS

FIG. 3 A diagram for explaining the spherical nano monocrystalline silicon S1 of FIG. 2, where (A) is a transmission electron microscope photograph of the spherical nano monocrystalline silicon, (B) is a small angle scattering spectrum analyzed by a small angle X-ray scattering measuring apparatus, (C) is a graph showing a radius distribution of the spherical nano monocrystalline silicon.

FIG. 4 A diagram for explaining a second manufacturing method of the quantum entanglement device of FIG. 1, where (A) is a cross-sectional view and (B) is an atom structure of the surface of the device.

FIG. 5 A table showing the coefficients $b_{\alpha\beta}$ of Formula 2, where (A) shows a scattering cross-section for the first excited state energy 1SC in a transition from a singlet level to a triplet level, and (B) shows a scattering cross-section for the second excited state energy 2SC in a transition from a singlet level to a singlet level.

FIG. 8 An analysis result of the scissor-type quantum entanglement element of FIG. 1 by the inelastic neutron scattering spectrometer, where (A) is a two-dimensional plot diagram showing the normalized scattering strength S(Q, E) of energy 200 to 250 meV and (B) is a sliced normalized scattering strength (Q, 226 meV) at the second excited energy level 2SC=226 meV of (A).

FIG. 12 A diagram for explaining the spread of ununiform energy levels required to discriminate individual scissor-type quantum elements from each other, when a plurality of scissor-type quantum entanglement elements of FIG. 1 are arranged, where (A) is a perspective view of the quantum entanglement device, (B) is an energy level diagram, and (C) is a frequency spectrum diagram of absorption and emission of light.

FIG. 13 A diagram for explaining the operation of a control NOT gate of the scissor-type quantum entanglement element of FIG. 1.

FIG. 14 A diagram for explaining a quantum teleportation protocol using the scissor-type quantum entanglement of FIG. 1, where (A) is an arrangement diagram of quantum bits and (B) is a connection diagram.

FIG. 17 A diagram for explaining a prior art quantum entanglement device, where (A) is an energy level diagram and (B) is a diagram showing a cascade transition.

EMBODIMENTS

Figure 1:
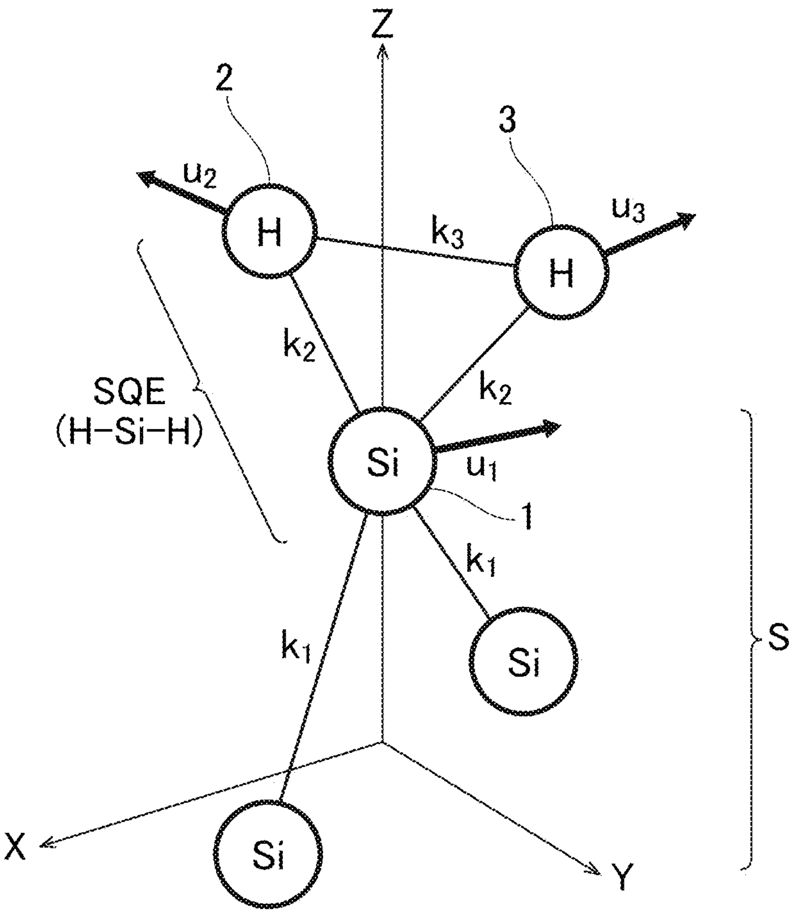
FIG. 1 An atom arrangement diagram illustrating an embodiment of the quantum entanglement device according to the present invention.

FIG. 1 is an atom arrangement diagram illustrating an embodiment of the quantum entanglement device according to the present invention.

As illustrated in FIG. 1, the quantum entanglement device is constructed by a silicon semiconductor S and a scissor-type quantum entanglement element SQE formed by hydrogen atoms (protons) (H) 2 and 3 coupled to one silicon atom 1 on the surface of the silicon semiconductor S. That is, in the silicon semiconductor S, two of the silicon atoms 1 are bonded by a covalent bond with a spring constant $k_1$. Also, in the scissor-type quantum entanglement element SQE, the hydrogen atoms 2 and 3 are bonded to the silicon atom 1 by a covalent bond with a spring constant $k_2$, and no chemical bond is present between the hydrogen atoms 2 and 3 which mutually interact with the silicon atom 1 via a spring constant $k_3$. Here, the vibration of the scissor-type quantum entanglement element SQE is represented by a harmonic oscillator. In consideration of its eigen-vibrational state, each of the hydrogen atoms 2 and 3 is a Fermion particle and an anti-symmetric characteristic is required with respect to the particle exchange. As a result, a correlation occurs between the spin degree of freedom and the eigen-vibrational state, so that a quantum entangled state, which is quantum-mechanically indistinguishable, is formed. Since the zero-point vibrational energy in a quantum entanglement state is not smaller than 100 meV, a scissor-type quantum entanglement element SQE which stably operates in a 600 K temperature region is thereby constructed.

Figure 2:
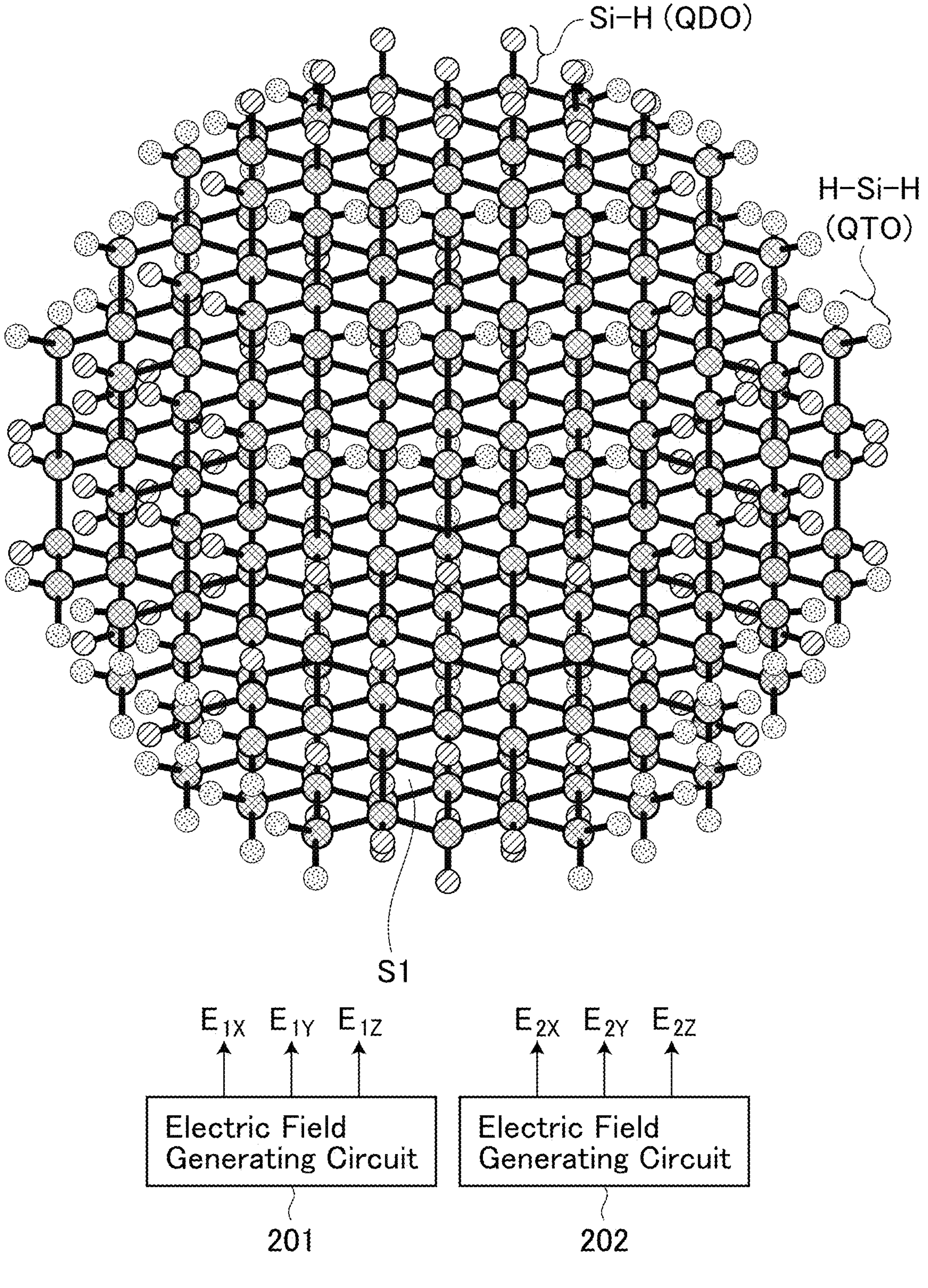
FIG. 2 An atom arrangement diagram illustrating a first manufacturing method of the quantum entanglement device of FIG. 1.

FIG. 2 is an atom arrangement diagram illustrating a first manufacturing method of the quantum entanglement device of FIG. 1.

First, a monocrystalline silicon substrate (not shown) is etched by an electrochemical anodizing process, to form an aggregate spherical nano monocrystalline silicon S1, as illustrated by a transmission electron microscope photograph of (A) of FIG. 3. Here, the etching process is under a condition that the current density is 10 $mA/cm^2$, and the etching solution is a mixture solution of $HF:H_2O:C_2H_5OH=3:3:4$.

Also, the monocrystalline silicon substrate is a p-type (100) substrate whose specific resistivity is 3 to 5 Ω·cm. The spherical nano monocrystalline silicon S1 is analyzed by a small angle X-ray scattering measuring apparatus, to obtain a small angle scattering spectrum I(q) for the wave number q as illustrated in (B) of FIG. 3. This spectrum is analyzed by a polydispersed hard sphere model, so that the spherical nano monocrystalline silicon S1 can be evaluated to have a radius R(nm) distribution having various radius sizes, as illustrated in (C) of FIG. 3. According to the radius size distribution N of (C) of FIG. 3, the radius R of the spherical nano monocrystalline silicon S1 ranges from 0.4 to 2. 5 nm whose mean radius R is 1.2 nm and whose mean diameter is 2.4 nm. A crystalline schematic diagram of the spherical nano monocrystalline silicon S1 having a diameter of 2.4 nm is illustrated in FIG. 2. The 2.4 nm diameter spherical nano monocrystalline silicon S1 is composed of 377 silicon atoms whose surface structure is analyzed by an infrared absorption spectrum evaluation method, an electron spin resonance method and a secondary ion mass analysis evaluation method. These methods show that the entire surface of the spherical nano monocrystalline silicon S1 is fully terminated with hydrogens H and there are little hydrogen-unterminated, unbonded chemical bonds, whose density of dangling bonds is $10^{15}/cm^3$.

Further, in order to reduce the dangling bond density on the surface of the spherical nano monocrystalline silicon S1 to hydrogenate, a hydride termination process is carried out. For example, the spherical nano monocrystalline silicon S1 is dipped in less than 10% hydrofluoric acid (HF) solution or 40% buffered fluoric acid ($NH_4F$) solution. This hydride termination process makes the dangling bond density not larger than $10^{14}/cm^3$. Thus, since the surface of the obtained spherical nano monocrystalline silicon S1 is spherical, various crystalline faces such as (100) faces and (111) faces are microscopically mixed. As a result, $SiH_2$ terminations are formed on (100) faces, and SiH terminations are formed on (111) faces. In the spherical nano monocrystalline silicon S1 obtained by the electrochemical anodizing process, the occupied area of the (100) faces is approximately the same as the occupied area of the (111) faces, and actually, it is turned out by the infrared absorption spectrum measuring method that the ratio of the number of $SiH_2$ terminations to that of SiH terminations is 1:1. As illustrated in FIG. 2, 196 hydrogen atoms (H) terminated on the surface of the spherical nano monocrystalline silicon S1 have a surface structure including approximately the same number of SiH (quantum double oscillator, QDO) and $SiH_2$ (quantum triple oscillator, QTO).

Thus, a very large number of $SiH_2$ terminations as quantum triple oscillators (QTOs) are solidly formed as the scissor-type quantum entanglement elements (SQEs) of FIG. 1.

Note that the quantum triple oscillator (QTO) formed by terminated $SiH_2$ is in a harmonically oscillated state of Si and two hydrogens, so that a spin state is either a symmetric spin state or an antisymmetric spin state in response to a parity exhibited by the harmonic oscillator. On the other hand, the quantum double oscillator (QDO) formed by terminated SiH is in a harmonically oscillated state of Si and one hydrogen. Also, in order to make the normal vibration of the scissor-type quantum entanglement element SQE to an excited state or a ground state, an electric field generating circuit 201 for generating electric fields $E_{1X}$, $E_{1Y}$ and $E_{1Z}$ to supply them to the group-IV semiconductor S1 (or a magnetic field generating circuit for generating magnetic fields or an electric beam generating circuit for generating electron beams) is provided. In addition, in order to resolve the degenerated energy levels of the scissor-type quantum entanglement element SQE, an electric field generating circuit 202 for generating electric fields $E_{2X}$, $E_{2Y}$ and $E_{2Z}$ (or a magnetic field generating circuit for generating magnetic fields) is provided. Note that the electric field generating circuits 201 and 202 can be combined as one electric field generating circuit.

FIG. 4 is a diagram for explaining a second manufacturing method of the quantum entanglement device of FIG. 1, where (A) is a cross-sectional view and (B) is an atom structure of the surface of the device.

First, a (100)-face monocrystalline silicon S2 as illustrated in (A) of FIG. 4 is prepared. Note that a thin natural oxide ($SiO_2$) layer $S2_0$ is usually formed on the surface of the (100)-face monocrystalline silicon S2.

Next, a hydride termination process is performed upon the (100)-face monocrystalline silicon S2. For example, less than 10% hydrofluoric acid (HF) solution or 40% buffered fluoric acid ($NH_4$ F) solution is used to etch the surface of the (100)-face monocrystalline silicon S2 to remove the thin natural oxide ($SiO_2$) layer $S2_0$. After the removal, as illustrated in (B) of FIG. 4, $SiH_2$ terminations are formed on the (100)-face of the (100)-face monocrystalline silicon S2.

Thus, a large number of $SiH_2$ terminations as quantum triple oscillators (QTOs) are solidly formed as the scissor-type quantum entanglement elements SQE of FIG. 1 on the surface of the (100)-face monocrystalline silicon S2. Note that no SiH termination is formed on the (100)-face monocrystalline silicon S2. Also, in order to control the normal vibration of the scissor-type quantum entanglement element SQE in an excited state or a ground state, an electric field generating circuit 401 for applying electric fields $E_{1X}$, $E_{1Y}$ and $E_{1Z}$ to the group-IV semiconductor S2 (or a magnetic field generating circuit for generating magnetic fields or an electric beam generating circuit for generating an electric beam) is provided. Further, in order to resolve the degenerated energy levels of the scissor-type quantum entanglement element SQE, an electric field generating circuit 402 for applying electric fields $E_{2X}$, $E_{2Y}$ and $E_{2Z}$ (or a magnetic field generating circuit for generating magnetic fields) is provided. Note that the electric field generating circuits 401 and 402 can be combined as one electric field generating circuit.

The above-mentioned quantum entanglement state is recognized by measuring an infrared vibrational state using the inelastic neutron scattering (INS) spectroscopy. In the inelastic neutron scattering spectroscopy, a neutron inelastic scattering is measured by a time-of-flight (TOF) from generation of a neutron to detection thereof. The infrared vibrational state is given by a graph of a two-dimensional plot normalized scattering strength S(Q,E) of Q and E which will be later stated, and the normalized scattering strength is theoretically given by the following Formula 2.

[Formula 2]

$$S(Q,\hbar\omega)=\sum_i\sum_f\sum_{\alpha=1}^{3}\sum_{\beta=1}^{3}p_i b_{\alpha\beta}\langle\Phi_i|\exp(i\vec{Q}\cdot\vec{r}_\alpha)|\Phi_f\rangle^*\langle\Phi_f|\exp(i\vec{Q}\cdot\vec{r}_\beta)|\Phi_i\rangle\delta(\hbar\omega-E_f+E_i)$$

where prefix i is an initial state, suffix f is a final state, $p_i$ is a statistical weight, Q is a momentum transfer vector (wave-number vector difference=$k_i$-$k_f$) from the initial state i to the final state f, E is an energy transition of a neutron from the initial state i to the final state f (in the specification, referred simply to as an energy where the neutron initial state energy is $E_i$=0.5 eV and the neutron final state energy is $E_f$), $b_{\alpha\beta}$ is a scattering length product (scattering cross section) at each nucleus (α or β=1 designates the Si atom 1, and α or β=2 or 3 designates the hydrogen atom 2 or 3), $r_\alpha$ is a position vector at the nucleus α, $r_\beta$ is a position vector at the nucleus β, and ϕ is a wave function of a harmonic oscillator represented by a quantum number $n_{\nu\rho}$ and a normal coordinate $\xi_{\nu\rho}$, and represented by a product of a Hermite polynomial and a Gauss function. In this case, when $E=E_f-E_i$, Formula 2 is represented by S(Q,E). Here, suffix ρ designates X-coordinate, Y-coordinate or Z-coordinate, and ν designates the number of a normal coordinate. Therefore, the energy level $E_{\nu\rho}$ is represented by Formula 3.

[Formula 3]

$$E_{\nu\rho}=\sum_{\nu=1}^{3}\sum_{\rho=x}^{Z}\left(n_{\nu\rho}+\frac{1}{2}\right)\hbar\omega_{\nu\rho}$$

where angular frequency $\omega_{\nu\rho}$ is a function of spring constant $k_{1\rho}$, $k_{2\rho}$, and $k_{3\rho}$ and masses $m_1$, $m_2$ and $m_3$ (=$m_2$).

By the way, the wave function ϕ of the harmonic oscillator represented by the above-mentioned quantum number $n_{\nu\rho}$ is represented by the normal coordinates $\xi_{1\rho}$, $\xi_{2\rho}$ and $\xi_{3\rho}$ such as ϕ ($\xi_{1\rho}$), and the normal coordinates and the displacement vectors $u_{1\rho}$, $u_{2\rho}$, and $u_{3\rho}$ represented in FIG. 1 have the relationship of Formula 4.

[Formula 4]

$$\begin{pmatrix}\xi_{1p}\\ \xi_{2p}\\ \xi_{3p}\end{pmatrix}=\begin{pmatrix}\frac{1}{\sqrt{\theta_p^2+1}} & \frac{\theta_p}{\sqrt{\theta_p^2+1}} & 0\\ \frac{-\theta_p}{\sqrt{\theta_p^2+1}} & \frac{1}{\sqrt{\theta_p^2+1}} & 0\\ 0 & 0 & 1\end{pmatrix}\begin{pmatrix}\sqrt{m_1}\,u_{1p}\\ \sqrt{m_2/2}\,(u_{2p}+u_{3p})\\ \sqrt{m_2/2}\,(u_{2p}-u_{3p})\end{pmatrix}$$

where $\theta_\rho$ is a function of spring constants $k_{1\rho}$, $k_{2\rho}$ and $k_{3\rho}$ and masses $m_1$, $m_2$ and $m_3$ (=$m_2$), in the same way as in angular frequency $\omega_{\nu\rho}$.

The total wave function $\Psi n_{\nu\rho}$ ($\xi_{\nu\rho}$) showing the scissor-type quantum entanglement element SQE formed by the silicon atom 1 and the hydrogen atoms 2 and 3 is represented by a product of the wave function $\phi n_{\nu\rho}$ ($\xi_{\nu\rho}$) having the normal coordinates as variables and the spin wave function σ $n_{\nu\rho}$ ($\xi_{\nu\rho}$) i.e., by Formula 5.

$$\Psi_{n_{\nu\rho}}(\xi_{\nu_\rho})=\Phi_{n_{\nu\rho}}(\xi_{\nu\rho})\cdot\sigma_{n_{\nu\rho}}(\xi_{\nu\rho}).$$

By the way, hydrogen atom (proton) is a Fermion with spin 1/2, and therefore, the two hydrogen atoms 2 and 3 require that the total wave function $\Psi n_{\nu\rho}$ ($\xi_{\nu\rho}$) is anti-symmetric with respect to the exchange of the hydrogen atom coordinates. That is, when an exchange operation P is performed upon the hydrogen atoms coordinates u 20 and u 30 , Formula 4 is changed to $P\xi_{1\rho}=\xi_{1\rho}$, $P\xi_{2\rho}=\xi_{2\rho}$, and $P\xi_{3\rho}=-\xi_{3\rho}$, and accordingly, the Hermite polynomial formula $Hn_{\mu\rho}$ ($\xi_{\nu\rho}$) is an even function in a case where the quantum number $n_{\nu\rho}$ is an even number, and the Hermite polynomial formula $Hn_{\nu\rho}$ ($\xi_{\nu\rho}$) is an odd function in a case where the quantum number $n_{\nu\rho}$ is an odd number, so that in $Hn_{3\rho}$ ($\xi_{3\rho}$), the odd-numbered energy level is converted by the exchange operation P like this: $P\phi_{odd}(\xi_{3\rho})=-\phi_{odd}(\xi_{3\rho})$. Since the total wave function $\Psi n_{\nu\rho}(\xi_{\nu\rho})$ is required to be anti-symmetric, an odd-numbered energy level should have a symmetric spin state like a triplet nuclear spin state, and an even-numbered energy level should have an anti-symmetric spin state like a singlet nuclear spin state. Therefore, the vibrational state represented by this coordinate $\xi_{3\rho}$ can be expressed by a scissor vibrational state (SC mode).

As to the symmetry of the other coordinates than $\xi_{3\rho}$, since $P\phi n_{1\rho}$ ($\xi_{1\rho}$)=$\phi n_{1\rho}(\xi_{1\rho})$ and $P\phi n_{2\rho}(\xi_{2\rho})=\phi n_{2\rho}(\xi_{2\rho})$, so that no change occurs in the sign of the vibrational wave function. Therefore, the requirement of the anti-symmetry of the total wave function $\Psi n_{\nu\rho}(\xi_{\nu\rho})$ is received by the term of the spin state wave function, so that all the energy states of $n_{1\rho}$ and $n_{2\rho}$, become singlet nuclear spin states.

The scissor-type quantum entanglement element SQE consisting of the silicon atom 1 and the hydrogen atoms 2 and 3 as illustrated in FIG. 1 is a quantum entanglement device described by a singlet nuclear spin state or a triplet nuclear spin state from the requirement that the total wave function is anti-symmetric with respect to the exchange of the two hydrogen atoms. The feature of this quantum entanglement device is in that all the physical vibrational states of a system consisting of the silicon atom 1 and the hydrogen atoms 2 and 3 are quantum entangled states where the singlet nuclear spin state and the triplet nuclear spin state are in the most quantum-entangled state.

Compared with a prior art quantum entanglement element consisting of a hydrogen molecule (see: Non-patent Literature 1) where the difference in energy observed by the hydrogen molecule is 10 meV, in the scissor-type quantum entanglement element SQE according to the present invention consisting of two hydrogen atoms, an anti-symmetric wave function generated from a product of the vibrational wave function and the spin wave function induces a large difference 113 meV in energy between a singlet ground state and a triplet first excited state in the scissor vibrational state (SC mode), so that the quantum entanglement element SQE can stably operate even at room temperature. Also, the prior art quantum entanglement element (see: Non-patent Literature 1) where hydrogen molecules are in a gas state needs a gas cell or the like, while the scissor-type quantum entanglement element SQE of the present invention which is solidly fixed to the silicon surface is suitable in practical use.

The normalized scattering strength S(Q,E) at each energy level can be obtained by performing an algebraical calculation upon a nuclear spin wave function and a neutron spin wave function. The first excited state energy 1SC at the above-mentioned SC mode is 113 meV, which corresponds to a transition from $n_{3x}=n_{3Y}=0$ to $n_{3x}=n_{3Y}=1$ denoted by quantum numbers (from an even function to an odd function). In this case, the modes of the X and Y directions are degenerated. The coefficient $b_{\alpha\beta}$ of Formula 2 of the transition from the singlet level to the triplet level corresponding to the energy level 1SC is calculated by the table as illustrated in (A) of FIG. 5. The second excited state energy 2SC at the above-mentioned SC mode is 226 meV, which corresponds to a transition from $n_{3x}=n_{3Y}0$ to $n_{3x}+n_{3Y}=2$ denoted by quantum numbers, i.e., a transition from an even function to an even function. In this case, the modes of the X and Y directions are degenerated. The coefficient $b_{\alpha\beta}$ of Formula 2 of the transition from the singlet level to the singlet level corresponding to the energy level 2SC is calculated by the table as illustrated in (B) of FIG. 5. Note that $\sigma_{inc}$ is a incoherent scattering cross-section of a neutron that each atom has and $\sigma_{coh}$ is a coherent scattering cross-section of the neutron.

Figure 6:
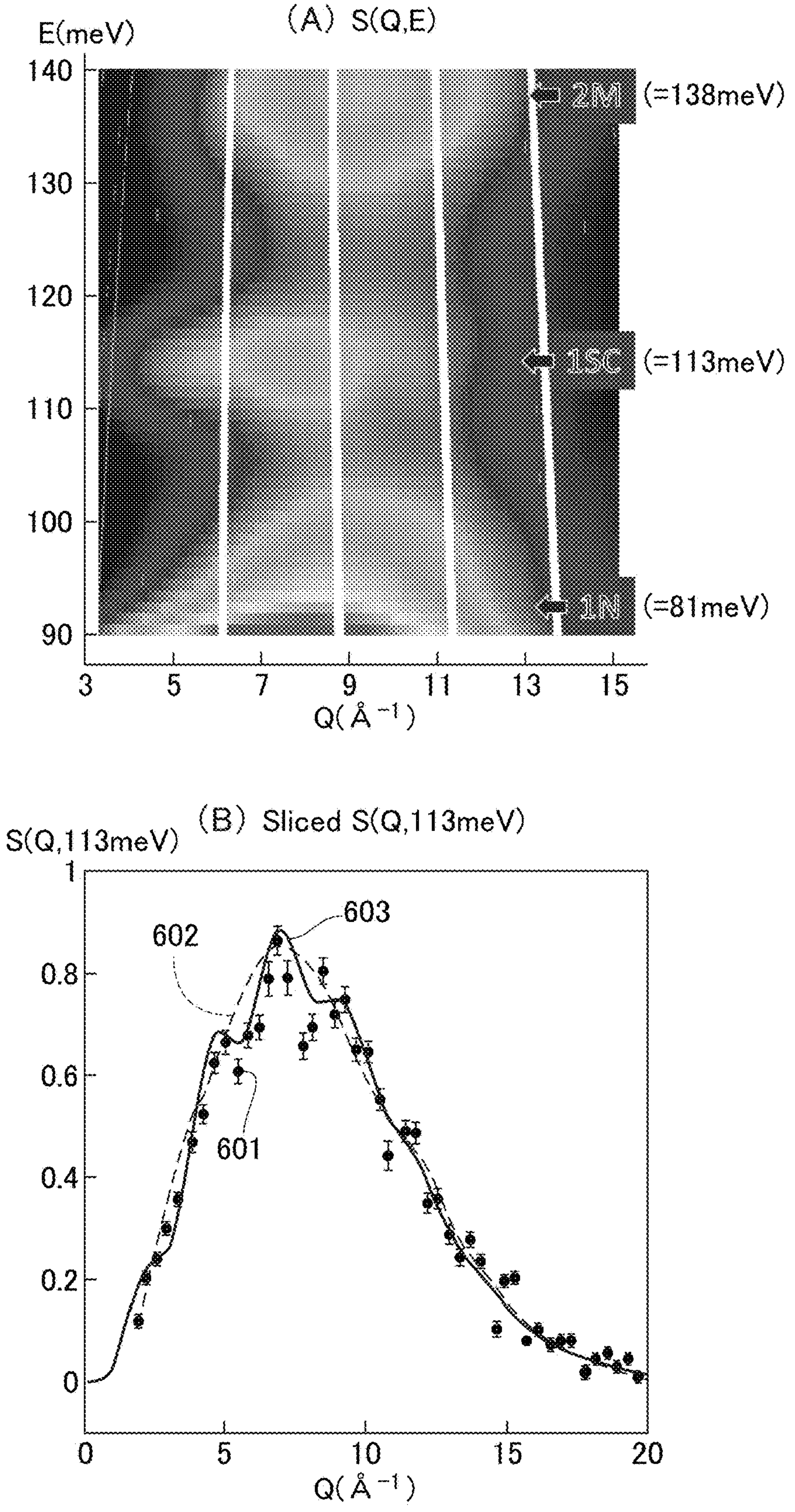
FIG. 6 An analysis result of the scissor-type quantum entanglement element of FIG. 1 by the inelastic neutron scattering spectrometer, where (A) is a two-dimensional plot diagram showing the normalized scattering strength S(Q, E) of energy 90 to 140 meV and (B) is a sliced normalized scattering strength (Q, 113 meV) at the energy level 1SC=113 meV of (A).

Referring to the incoherent scattering cross-section $b_{\alpha\beta}$ at the transition from singlet level to triplet level as illustrated in (A) of FIG. 5, since this term gives the scattering strength S of the energy level 1SC (=113 meV), and the diagonal components ($b_{22}$ and $b_{33}$) can be described by the hydrogen incoherent scattering, the scattering strength S of the energy level 1SC(=113 meV) is expected to be large. Referring to the two-dimensional plots S(Q, E) of (A) of FIG. 6 which are experimental values of the inelastic neutron scattering, it is found that an intense scattering occurs at the energy level 1SC (=113 meV). The energy levels 1N(=80 meV) and 2M(=140 meV) show intense scattering caused by SiH. Although the energy level 1SC is located between these two spectra, the energy level 1SC is obviously present. That is, as illustrated by the experimental values 601 in (B) of FIG. 6 which is a sliced spectrum of S(Q, E) at E=113 meV, the neutron scattering of the energy level 1SC forms an intense scattering spectrum having a peak at the momentum transfer Q=6.8 $Å^{-1}$.

Figure 7:
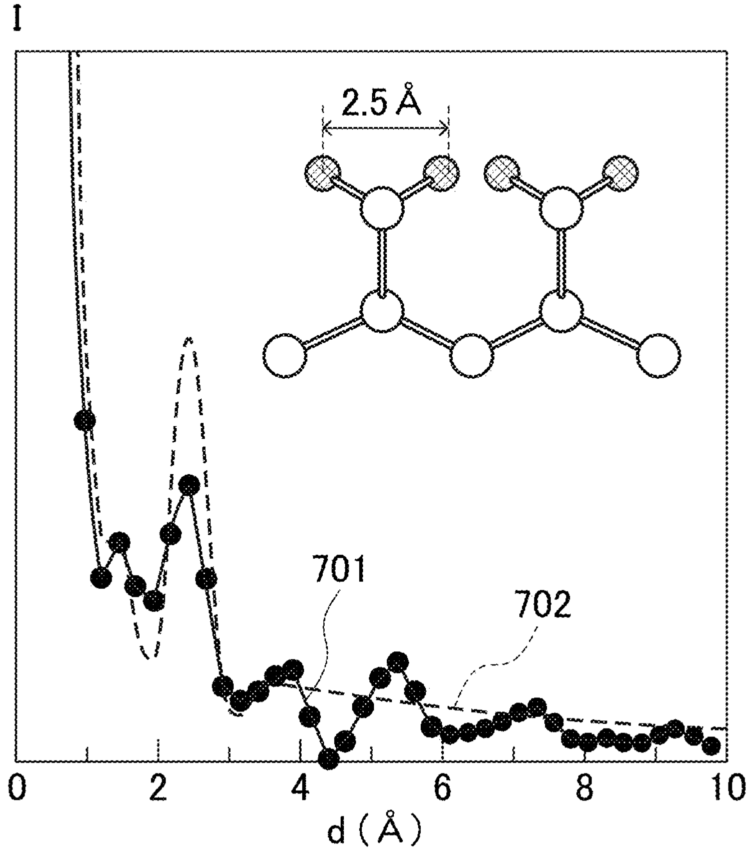
FIG. 7 A graph showing a Fourier-transformed spectrum of the normalized scattering strength S(Q, 113 meV) at the energy level 1SC of FIG. 6 (B).

Referring to the incoherent scattering cross-section $b_{\alpha\beta}$ at the transition from singlet level to triplet level as illustrated in (A) of FIG. 5, since this term gives the scattering strength S of the energy level 1SC (=113 meV), and the non-diagonal components ($b_{23}$ and $b_{32}$) can be described by the hydrogen incoherent scattering, the scattering strength S of the energy level 1SC(=113meV) is expected to have a large interference pattern. Referring to the experimental values 601 of the inelastic neutron scattering as illustrated in (B) of FIG. 6 which is a sliced spectrum of S(Q, E) of (A) of FIG. 6 at E=113 meV, an interference pattern is obviously observed in the scattering spectrum. This interference pattern shows that two hydrogens are in a quantum entanglement state, and it is theoretically expected that this state has a frequency component of an interatomic distance 2.5 Å of the two hydrogens. The experimental values 601 of (B) of FIG. 6 of the inelastic neutron scattering is Fourier-transformed to evaluate what interatomic distance the interference pattern is originated from. The evaluation result is illustrated in FIG. 7. It is evidenced experimentally by experimental values 701 and theoretically by theoretical values 702 that the large interference in the scattering of the energy level 1SC(=113 meV) is originated from the interatomic distance 2.5 Å of the hydrogen atoms.

In a case of no quantum entanglement state, interference patterns are not observed in the scattering spectrum. In (B) of FIG. 6, theoretical values 602 show a case of no quantum entanglement, and theoretical values 603 show a case of presence of a quantum entanglement. The theoretical values 602 in case of no quantum entanglement form a smooth curve with no interference pattern. In a Fourier-transformed spectrum of the theoretical values 602 with no quantum entanglement, it is turned out that there is no clear spectrum peak.

On the other hand, referring to the coherent scattering cross-section $b_{\alpha\beta}$ at the transition from singlet level to singlet level as illustrated in (B) of FIG. 5, since this term gives the scattering strength S of the energy level 2SC (=226 meV), and all the diagonal components and the non-diagonal components can be described by the coherent scattering terms of the hydrogen and silicon atoms, the scattering strength S of the energy level 2SC (=226meV) is expected to be much smaller as compared with the scattering strength S of the energy level 1SC(=113meV), i.e., not larger than tenth thereof. Note that, $\sigma_{coh}^{(H)}=1.76$, $\sigma_{coh}^{(Si)}=2.16$, and $\sigma_{inc}^{(H)}=80.26$ and $\sigma_{inc}^{(Si)}=0.0082$. Referring to (A) of FIG. 8 which shows experimental values of inelastic neutron scattering, it is turned out that no scattering is observed in the energy level 2SC. In (A) of FIG. 8, the energy levels 3M(=217 meV) and 3N(=237 meV) show intensive scattering caused by SiH. Although the energy level 2SC is located between these two spectra so that it is almost undetectable, it is turned out that the energy level 2SC is extinguished or at least so weak that it is hidden in the scattering of the energy levels 3M and 3N. That is, the experimental values 801 in (B) of FIG. 8 which is a sliced spectrum of S(Q, E) at E=226 meV does not form an obvious scattering spectrum.

In (B) of FIG. 8, when the scattering spectrum of the experimental values 801 is fitted to the theoretical values 802 in case of no quantum entanglement and the theoretical values 803 in case of presence of a quantum entanglement, it is suggested that the scattering of spectrum shown by the experimental values 801 at the energy level 2SC is closer to the theoretical values 803 in case of presence of a quantum entanglement, thus realizing a quantum entanglement state. Note that the small difference between the theoretical values 803 and the experimental values 801 of the 2SC energy level is considered due to the background components of scattering originated from the energy levels 3M and 3N extending into the energy level 2SC.

Figure 9:
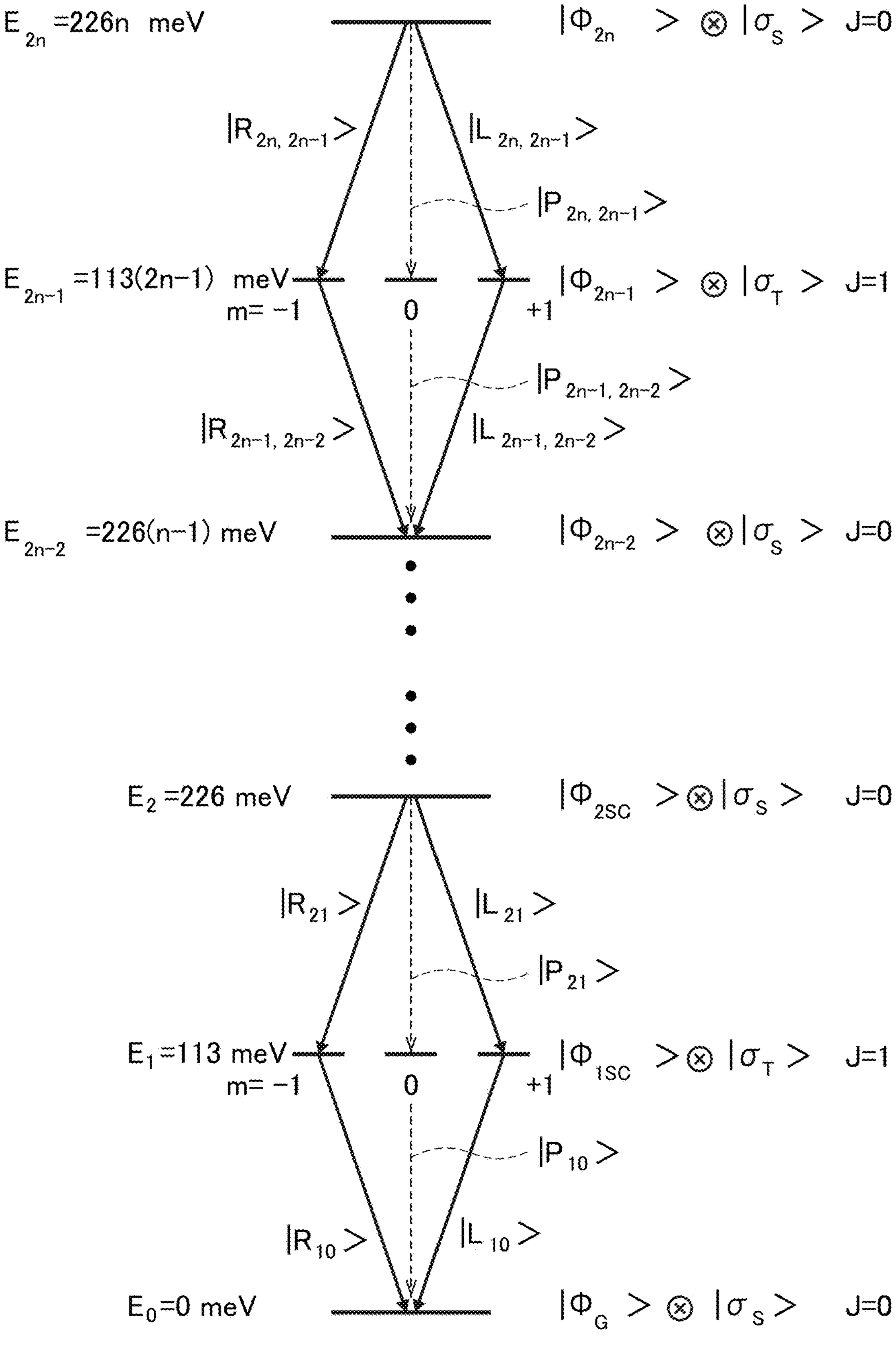
FIG. 9 An energy level diagram of the quantum entanglement element using the scissor vibrational mode (SC mode) of FIG. 1.

According to the above-mentioned experimental values and their analysis, all the physical vibrational states of the system consisting of the silicon atom 1 and the hydrogen atoms 2 and 3 as illustrated in FIG. 1 become in a singlet nuclear spin state or a triple nuclear spin state, thus forming a most quantum-entangled state, which obviously realizing an optimal entanglement device FIG. 9 is an energy level diagram of the scissor-type quantum entanglement element SQE of FIG. 1.

The scissor-type quantum entanglement element SQE of FIG. 1 operates as a quantum triple oscillator (QTO). Particularly, since the SC mode is a state where a singlet nuclear spin state or a triple nuclear spin state are alternately-superposed, the scissor-type quantum entanglement element SQE enables a cascade radiation of entangled photons as indicated by solid arrows in FIG. 9. As illustrated in FIG. 9, the SC mode of the scissor-type quantum entanglement element SQE has an evenly-spaced 2n level structure formed by energy levels $E_0$, $E_1$, $E_2$, . . . , $E_{2n-2}$, $E_{2n-1}$ and $E_{2n}$. Each of the energy levels $E_0$, $E_1$, $E_2$, . . . , $E_{2n-2}$, $E_{2n-1}$ and $E_2n$ has a wave function consisting of a product of a wave function $\phi$ of a harmonic oscillator and a proton spin wave function $\sigma$. Thus, the even-numbered energy levels $E_0$=0 meV, $E_2$=226 meV, . . . are in a spin singlet state (J=0), and the odd-numbered energy levels $E_1$=113 meV, $E_3$=339 meV, . . . are in a spin triplet state (J=1). These energy levels are similar to those for emitting photon pairs in the prior art as illustrated in FIG. 17. Therefore, cascade transitions $|R_{2n,\ 2n-1}>$, $|R_{2n-1,\ 2n-2}>$; . . . ; $|R_{21}>$, $|R_{10}>$ by right-circulated polarizations and cascade transitions $|L_{2n,\ 2n-1}>$, $|L_{2n-1,\ 2n-2}>$; . . . ; $|L_{21}>$, $|L_{10}>$ by left-circulated polarizations are generated. In this case, $|R_{2n,\ 2n-1}>$, $|R_{2n-1,\ 2n-2}>$; . . . ; $|L_{2n,\ 2n-1}>$, $|L_{2n-1,\ 2n-2}>$ are the same energy level 113 meV. Also in this case, for light transitions, since only the transitions where the angular momentum J is changed by ±1 are allowed, the SC mode, which is in a harmonic potential state for forming an evenly-spaced 2n level structure, emit only completely-entangled photon pairs.

Figure 16:
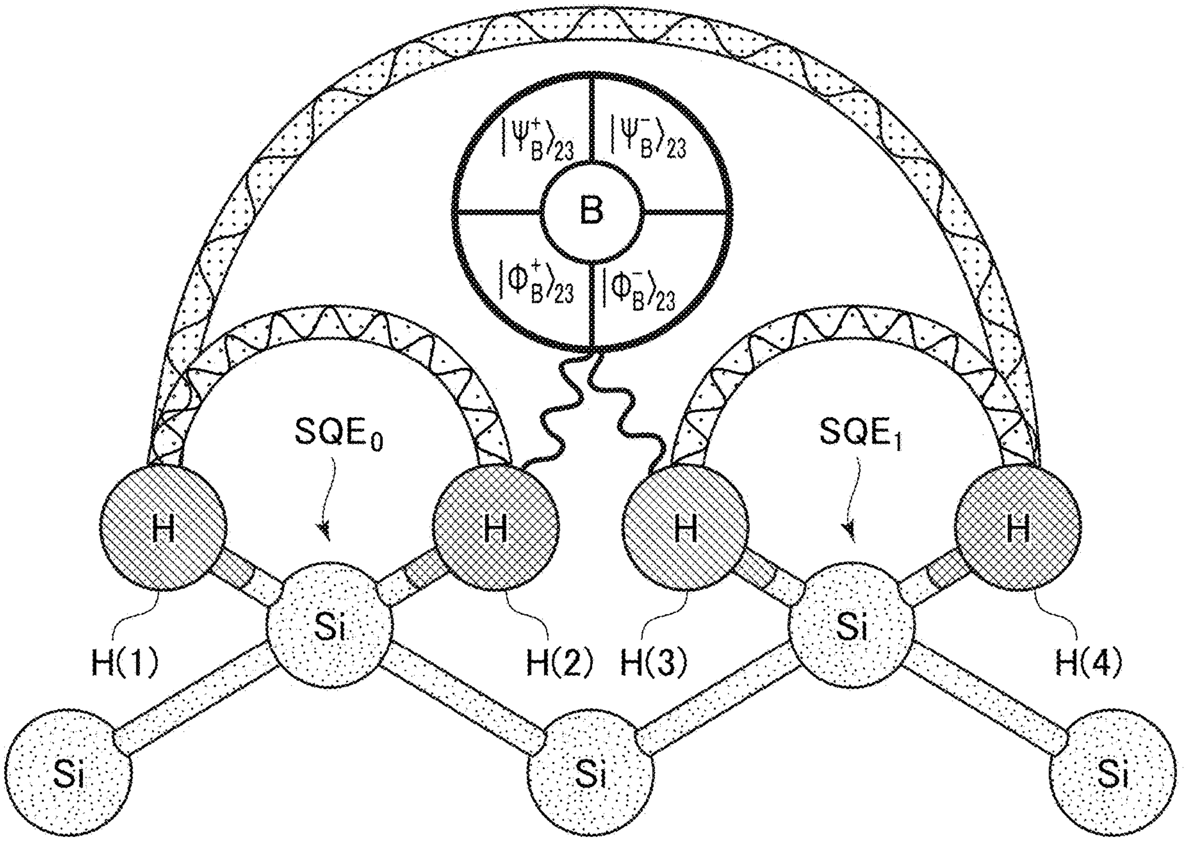
FIG. 16 A diagram illustrating a principle of a Bell measurement using the scissor-type quantum entanglement SQE of FIG. 1.

A direct product state of each of these entangled photon pairs is formed. Then, a Bell measurement is performed upon this state, as illustrated in FIG. 16 which will be later explained, so that a quantum teleportation or a quantum entangled swapping can occur in the physical state of entangled photon pairs among the scissor-type quantum entanglement elements (SQEs). The photon pairs emitted here become quantum entangled light whose frequency is 27 THz, i.e., THz-ranged light, which is used for a light source in a quantum light information communication, a quantum communication unit, a quantum cryptograph unit, a stealth-type radar, a quantum wireless light source, a noninvasive/nondestructive test unit and the like. Here, the quantum entangled photon pair state $\Theta_{20}$ from n=2 to n=0 is represented by Formula 6.

$$|\Theta_{20}>=\frac{1}{\sqrt{2}}(|L_{21}>|L_{10}>+|R_{21}>|R_{10}>). \qquad \text{[Formula 6]}$$

Further, the cascade transition at the quantum entangled photon pair state $\theta_{2no}$ is represented by Formula 7.

$$|\Theta_{2n0}>=\bigotimes_{j=1}^{n}|\Theta_{2j2j-2}>. \qquad \text{[Formula 7]}$$

Note that each of the entangled photon pairs has the same frequency 27 THz, which is a feature of the quantum entanglement device of the present invention.

Note that, for some reasons of quantum information processing, it is also required to change the above-mentioned energy levels of each entangled photon pairs. In this case, a technique is adopted to forma strain layer as an underlayer of the (100)-face monocrystalline silicon S2. For this, an impurity addition, a defect formation or the like is performed upon the underlayer to form a sloped concentration therein.

For example, germanium impurities with a sloped concentration are added to the silicon underlayer of the (100)-face monocrystalline silicon S2. Otherwise, a $SiO_2$ underlayer S2$_1$ with a sloped thickness is provided. The silicon underlayer or the $SiO_2$ underlayer S2$_1$ serves as a strain layer, so that a strain is introduced into the (100)-face monocrystalline silicon S2, thus resolving all the degenerated energy levels. The strain formation by adding germanium impurities would be realized if only use was made of a strain silicon film forming technology utilized in a high speed CMOS circuit. That is, a conventional silicon wafer is used as a base, and a silicon germanium buffer layer with a sloped concentration is formed on the base. Then, a silicon film is epitaxially grown on the silicon germanium buffer layer with a large lattice constant. Thus, a tensile strain is generated along an in-plane direction {(100)-face direction } and a compression strain is generated along a direction {(001)-face direction} perpendicular to the in-plane direction, which locally changes the spring constant $k_1$ shown in FIG. 1 in accordance with the concentration of germanium, thereby to change the energy levels of the entangled photon pairs. On the other hand, the formation of the $SiO_2$ underlayer S2$_1$ would be realized if only use was made of an oxygen injection technology utilized in SIMOX (Separation By Implanted Oxygen) wafers and the like. That is, the irradiation time and injection amount are controlled to slopedly change the stoichiometric ratio of the Si layer S2 to the $SiO_2$ layer S2$_1$ , which generates a tensile strain along the in-plane direction {(100)-face direction} and a compression strain along the direction {(001)-face direction} perpendicular to the in-plane, in the same way as in the silicon germanium buffer layer, thereby locally changing the spring constant $k_1$ shown in FIG. 1. When it is difficult to introduce the strain, an electric field or a magnetic field is applied by the electric field generating circuit 402 (or the magnetic field generating circuit to the (100)-face monocrystalline silicon S2), to thereby resolve the degeneracy of the energy levels of the quantum entanglement elements. In this case, since the electric field interacts with a dipole that the eigen-vibrational state has and the magnetic field interacts with a spin, the directions of the electric field and the magnetic field are applied so that the direction of the generated dipole coincides with the direction of the generated spin (their inner product should be maximum). However, the spin state of the quantum entanglement element may be greatly changed depending upon the magnitude of the applied electric field or the applied magnetic field, so that the quantum entanglement element may be broken. Note that, since the quantum entanglement element SQE has a Frohlich interaction effect where even two resonant things or two things with close energy interact with each other, even when they are far away from each other, they interact with each other, a S2$_1$ layer with randomly-fluctuated concentration or randomly-fluctuated thickness can be provided even if the above-mentioned sloped concentration or sloped thickness is not provided.

Thus, the cascade radiation of entangled photons is possible by using the scissor-type quantum entanglement element SQE. Furthermore, in a system where a large number of scissor-type quantum entanglement elements SQEs are formed on the spherical nano monocrystalline silicon S1 or the (100)-face monocrystalline silicon S2, in addition to the above-mentioned cascade radiation of photon pairs as indicated by dotted arrows in FIG. 9, simultaneous phonon pairs' cascade emissions $|P_{2n},\ P_{2n-1}>$, $|P_{2n-1},\ P_{2n-2}>$, . . . , $|P_{21}>$, $|P_{10}>$ can be obtained, which has routes from a spin singlet state (J=0) at 226 meV to m=−1, 0, and +1 of a spin triple state (J=1) at 113 meV (three phonon pairs). These phonon pairs will propagate and relax to their adjacent elements SQEs in opposite directions. Since the probability of phonon pairs' cascade emissions depends greatly upon the geometric arrangement of their adjacent elements SQEs, the arrangement of the scissor-type quantum entanglement elements SQEs may be non-symmetric or random, for example, in order to suppress the phonon pairs' cascade transitions. The quantum state $\Omega_{20}$ of quantum entanglement photon pairs and phonon pairs from n=2 to n=0 is represented by Formula 8.

$$|\Omega_{20}>=\frac{1}{\sqrt{3}}(|L_{21}>|L_{10}>+|R_{21}>|R_{10}>+|P_{21}>|P_{10}>) \qquad \text{[Formula 8]}$$

Further, the cascade transition at the quantum state $\Omega_{2n0}$ of not smaller than 2n quantum entanglement photon pairs and phonon pairs is represented by Formula 9.

$$|\Omega_{2n0}>=\bigotimes_{j=1}^{n}|\Omega_{2j2j-2}> \quad \text{[Formula 9]}$$

5

Figure 10:
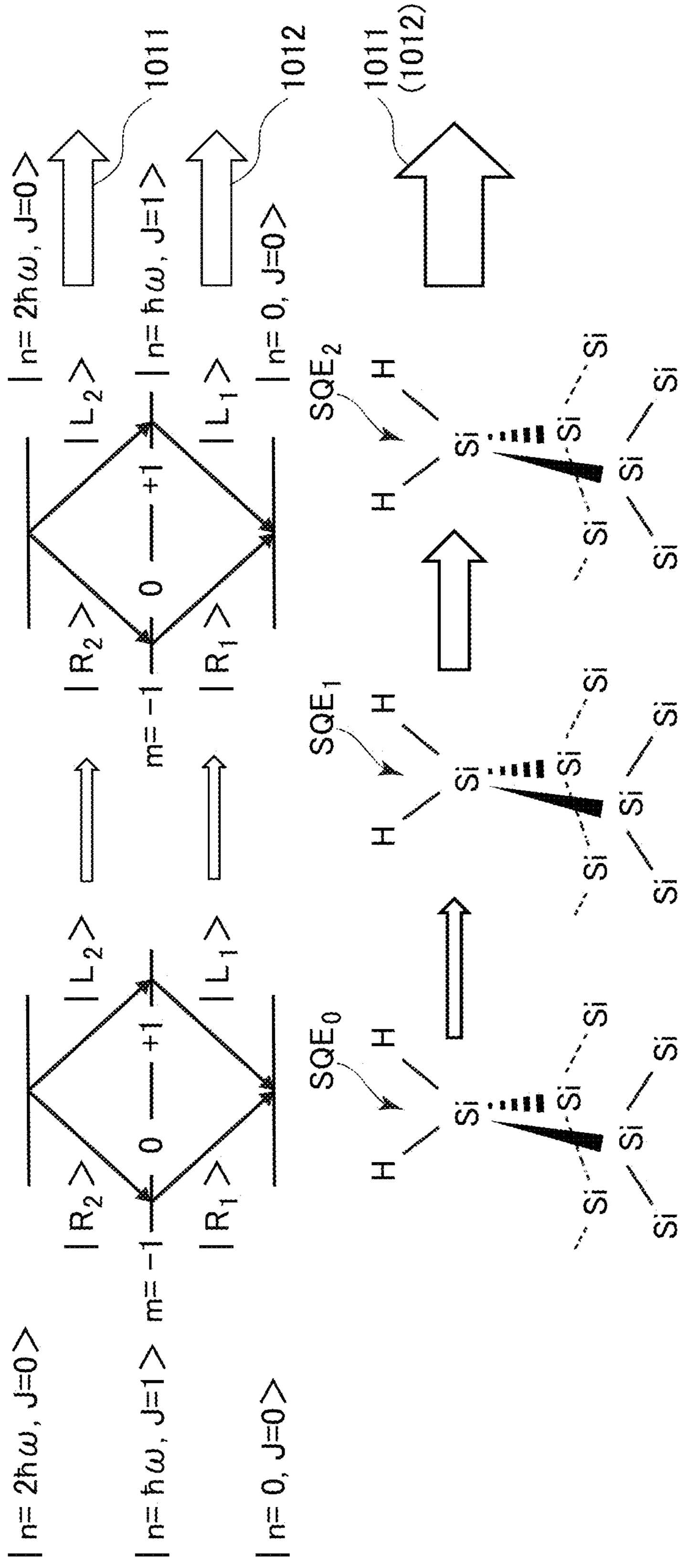
FIG. 10 A diagram illustrating a principle of a quantum entangled laser generation using two or more scissor-type quantum entanglement elements of FIG. 1.

FIG. 10 is a diagram illustrating a principle of a quantum entangled laser generation using two or more scissor-type quantum entanglement elements of FIG. 1.

By using the structure of FIG. 2 or (B) of FIG. 4, as illustrated in FIG. 10, the scissor-type quantum entanglement elements $SQE_0$, $SQE_1$ and $SQE_2$ are entirely made in an excited state, inducing stimulated emission and laser oscillation of entangled photon pairs, which was impossible in the prior art. This is advantageous in that, since the scissor-type quantum entanglement elements $SQE_0$, $SQE_1$ and $SQE_2$ are arranged in close proximity to each other, the entangled photon pairs can have a directional property, as compared with the prior art where photon pairs generate omnidirectionally (4 π).

Figure 11:
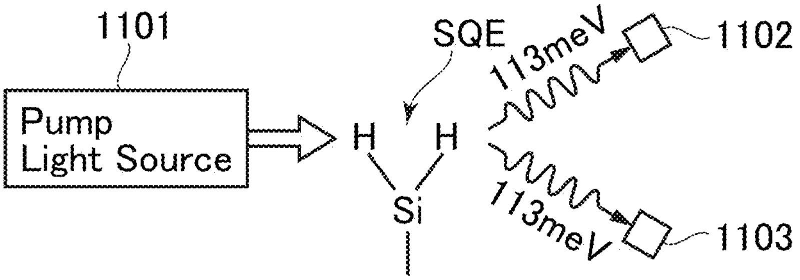
FIG. 11 A diagram illustrating a quantum entanglement photon pair generating device using the scissor-type quantum entanglement element SQE of FIG. 1.

FIG. 11 is a diagram illustrating a quantum entanglement photon pair generating device using the scissor-type quantum entanglement element SQE of FIG. 1.

In FIG. 11, when a pump-light source 1101 generates a pump light and transmits it to the scissor-type entanglement element SQE, the scissor-type entanglement element SQE generates a photon pair at an entangled state energy level 113 meV. This photon pair is detected by two detectors 1102 and 1103, the value of the one detector is "0" and the value of the other detector is "1". Thus, a photon pair generating device where a right-circulated polarization state is caused to be "1" and a left-circulated polarization state is caused to be "0".

FIG. 12 is a diagram for explaining the spread of ununiform energy levels required to discriminate individual scissor-type quantum elements from each other, when multiple scissor-type quantum entanglement elements of FIG. 1 are arranged, where (A) is a perspective view of the quantum entanglement device, (B) is an energy level diagram, and (C) is a frequency spectrum diagram of absorption and emission of light. Here, in order to simplify the description, an explanation is carried out regarding the vibration along the X-direction. Note that the Y-directional energy levels are the same as the X-directional energy levels, and the Z-directional energy levels are not used for these quantum computing operations.

A single scissor-type quantum entanglement element SQE has vibrational energy $\omega_1$(=60 meV), $\omega_2$(=80 meV) and $\omega_3$(=113 meV) represented by Formula 10, where the spring constants of FIG. 1 are given by $k_1$, $k_2$ and $k_3$, the mass of silicon is given by $m_1$ and the mass of hydrogen is given by $m_2$.

$$\omega_1^2=\frac{1}{2}\left\{(\alpha_{11}+\alpha_{22})-\sqrt{(\alpha_{11}-\alpha_{22})^2+4\alpha_{12}\alpha_{21}}\right\} \quad \text{[Formula 10]}$$

$$\omega_2^2=\frac{1}{2}\left\{(\alpha_{11}+\alpha_{22})+\sqrt{(\alpha_{11}-\alpha_{22})^2+4\alpha_{12}\alpha_{21}}\right\}$$

$$\omega_3^2=\alpha_{33}$$

where the relationship between a $\alpha_{\mu\nu}$ and spring constants $k_1$, $k_2$ and $k_3$, masses $m_1$ and $m_2$ is given by Formula 11.

$$\begin{pmatrix}\alpha_{11} & \alpha_{12} & 0\\ \alpha_{21} & \alpha_{22} & 0\\ 0 & 0 & \alpha_{33}\end{pmatrix}=\begin{pmatrix}\frac{k_1+2k_2}{m_1} & -\frac{\sqrt{2}k_2}{\sqrt{m_1m_2}} & 0\\ -\frac{\sqrt{2}k_2}{\sqrt{m_1m_2}} & \frac{k_2}{m_2} & 0\\ 0 & 0 & \frac{k_2+2k_3}{m_2}\end{pmatrix} \quad \text{[Formula 11]}$$

As illustrated in (A) of FIG. 12, when a sloped concentration of impurities is added or a sloped change of thickness is given to an underlayer $S2_1$ of the silicon S2 to introduce a strain in the silicon S2, the spring constant $k_1$ can be changed by a very small amount (which is about 1/10 of $k_1$), so that the energy of $\omega_2$ (=80 meV) can be widen, i.e., $\omega_2'$ has a width as in (B) of FIG. 12. Note that a base $S2_2$ of the underlayer $S2_1$ is made of silicon. In (A) of FIG. 12, $SQ_{11}$, $SQE_{21}$, are target quantum bits, and $SQE_{12}$, $SQE_{22}$, are control quantum bits.

$$\omega_1'^2=\omega_1^2+\left(1-\frac{\alpha_{11}-\alpha_{22}}{\sqrt{(\alpha_{11}-\alpha_{22})^2+4\alpha_{12}\alpha_{21}}}\right)\frac{k_1}{m_1}\eta\cong\omega_1^2 \quad \text{[Formula 12]}$$

$$\omega_2'^2=\omega_2^2+\left(1+\frac{\alpha_{11}-\alpha_{22}}{\sqrt{(\alpha_{11}-\alpha_{22})^2+4\alpha_{12}\alpha_{21}}}\right)\frac{k_1}{m_1}\eta\cong\omega_2^2+\frac{2k_1}{m_1}\eta$$

$$\omega_3'^2=\omega_3^2$$

Note that, even if the spring constant $k_1$ is changed, the energy levels $\omega_1$' and $\omega_3$' are not changed, as is understood from the representation of Formulae of $\omega_1$' and $\omega_3$'. Here, n is an amount in proportion to the strain, which amount is increased in proportion to the thickness of the $SiO_2$ layer ($\eta \propto d$), when the underlayer $S2_1$ is made of $SiO_2$.

When a large number of scissor-type quantum entanglement elements $SQE_{11}$, $SQE_{12}$, are arranged, the thickness of the underlayer $S2_1$ is slopedly-changed as illustrated in FIG. 12, for example, to introduce a strain in the silicon S2, in order to discriminate individual scissor-type quantum entanglement elements from each other. Thus, the energy level of $\omega_2$ (=80 meV) is changed to generate ununiform width therein, thereby to discriminate a large number of scissor-type quantum entanglement elements.

If only two functions called universal gates, i.e., a rotational operation function and a control NOT function of a qubit are provided, a quantum computing operation can be carried out. With respect to the rotational operation of a qubit, a coherent interaction of material and electromagnetic waves using a well-known resonant laser pulse is used. A unitary transformation of a rotational operation is given by Formula 13.

$$U_{ij}^{\beta}(\varphi)|0>=\cos\left(\frac{\beta}{2}\right)|0>-Ie^{I\varphi}\sin\left(\frac{\beta}{2}\right)|1>_{ij} \quad \text{[Formula 13]}$$

$$U_{ij}^{\beta}(\varphi)|1>_{ij}=\cos\left(\frac{\beta}{2}\right)|1>_{ij}-Ie^{-I\varphi}\sin\left(\frac{\beta}{2}\right)|0>$$

where i and j are positions of the qubits. Also, $\phi$ is an initial phase of the laser pulse and is fixed to $\pi/2$. Also, I is an imaginary number and $\beta$ satisfies Formula 14.

$$\beta=y\Omega\tau \quad \text{[Formula 14]}$$

where $\gamma$ is a proportional constant depending upon an interaction between a material and the electric field, $\Omega$ is a variable determined by the magnitude of the interaction between the material and the electric field and the strength of the laser pulse, and $\tau$ is a pulse width. A rotational operation (superposition) of a qubit is carried out by this unitary transformation.

FIG. 13 is a diagram for explaining the operation of a control NOT gate of the scissor-type quantum entanglement element of FIG. 1. For example, use is made of a $k_4$ interaction of the spring constant $k_4$ between the elements $SQE_{11}$ and $SQE_{12}$, which $k_4$ interaction occurs only when the scissor-type quantum entanglement elements $SQE_{11}$ and $SQE_{12}$ are excited. The weak $k_4$ interaction forms a coupled vibrational state which is well known in classical mechanics. In the quantum mechanically vibrational state, the quantum elements $SQE_{11}$ and $SQE_{12}$ are excited by using n pulses or the like to synchronize their phases ($|1>_{12}|1>_{11}$); however, in this case, since a weak $k_4$ interaction is generated between the excited states having the same spin, and the vibrations $V_{11}$ and $V_{12}$ are opposite in phase to each other, a state of $|1>_{12}|1>_{11}$ as illustrated in (A) of FIG. 13 is changed to a state of $-|1>_{12}|1>_{11}$ as illustrated in (B) of FIG. 13. Particularly, in the scissor-type quantum entanglement elements $SQE_{11}$ and $SQE_{12}$, since the energy state of $\omega_2$ (=80 meV) can have an ununiform width, and simultaneously, both the elements are in a singlet spin state, a $k_4$ interaction is generated to realize a quantum gate operation which changes a phase state of $|1>_{12}|1>_{11}$ as illustrated in (A) of FIG. 13 to a phase of $-|1>_{12}|1>_{11}$ as illustrated in (B) of FIG. 13. This operation is the same operation as that of the Cirac-Zoller gate (Hadamard gate) in an ion-trap type quantum computer. Hereafter, the operation rules by the $k_4$ interaction gate are summarized by Formula 15.

[Formula 15]

$$|0>_{12}|0>_{11} \rightarrow |0>_{12}|0>_{11}$$

$$|0>_{12}|1>_{11} \rightarrow |0>_{12}|1>_{11}$$

$$|1>_{12}|0>_{11} \rightarrow |1>_{12}|0>_{11}$$

$$|1>_{12}|1>_{11} \rightarrow |1>_{12}|1>_{11}$$

Finally, a control NOT gate can be realized by a combination of a rotational operation of a qubit and the above-mentioned $k_4$ interaction gate. Concretely, an initial phase $\pi/2$ and $\beta=-\pi/2$ pulse (corresponding to $3\pi/2$ pulse) irradiates an initial state of each element $SQE_{i1}$ to carry out a rotational operation, and since a unitary transformation $U(k_4)$ operation is completed in a nanosecond later, an initial phase $\pi/2$ and $\beta=\pi/2$ pulse is again irradiated to carry out another rotational operation, thus constructing a control NOT gate as shown in Formula 16.

[Formula 16]

$$U_{i1}^{\frac{\pi}{2}}\left(\frac{\pi}{2}\right)U(k_4)U_{i1}^{-\frac{\pi}{2}}\left(\frac{\pi}{2}\right)|0>|0> = |0>|0>$$

$$U_{i1}^{\frac{\pi}{2}}\left(\frac{\pi}{2}\right)U(k_4)U_{i1}^{-\frac{\pi}{2}}\left(\frac{\pi}{2}\right)|0>|1>_{i1} = |0>|1>_{i1}$$

$$U_{i1}^{\frac{\pi}{2}}\left(\frac{\pi}{2}\right)U(k_4)U_{i1}^{-\frac{\pi}{2}}\left(\frac{\pi}{2}\right)|1>_{i2}|0> = |1>_{i2}|1>_{i1}$$

$$U_{i1}^{\frac{\pi}{2}}\left(\frac{\pi}{2}\right)U(k_4)U_{i1}^{-\frac{\pi}{2}}\left(\frac{\pi}{2}\right)|1>_{i2}|1>_{i1} = |1>_{i2}|0>$$

The output results by the control NOT gate and the rotational gate operation can be evaluated by measuring an emission spectrum for each frequency occurred in about 1 ms later.

Thus, although a line width of each energy level is about MHz; however, ununiform line widths of about 1 THz can be formed by introducing a strain into silicon by a sloped underlayer or the like, the number of operable quantum bits becomes about $10^6$. In order to individually operate a large number of quantum bits, the frequency line width of laser light is made smaller. Here, since the line width of each energy level is determined by the relationship to their ground state, in order to individually operate the large number of quantum elements, a low temperature operation such as about 10 K operation is advantageous. When a quantum computing operation is carried out at room temperature, the line width of each energy level is widened from MHz to GHz, the number of operable quantum bits is reduced to about $10^3$.

Note that the X directional vibration was described in order to simplify the description; however, the X-directional vibration and the Y-directional vibration are combined to carry out a quantum operation with a memory function. Concretely, since the X-directional vibration does not interact with the Y-directional vibration, for example during a write operation, a control quantum bit is excited by a Y-directional electric field and a target quantum bit is excited by an X-directional electric field. When a quantum operation is required, the Y-directional vibration of the control quantum bit is transformed to an X-directional vibration, which uses the ground state as an auxiliary field. That is, the quantum bit written into the Y-direction is returned to the ground state by using a $\pi$ pulse having a Y-directional polarization, and then, this ground state quantum bit is transformed by a $\pi$ pulse with an X-directional polarization. Also, the Y-directional vibration control quantum bit can be transformed to an X-directional vibration by using the low level $\omega_1$(=60 meV) as an auxiliary field and by performing two rotational operations using a circular polarization electromagnetic field with an energy level of $(\omega_2-\omega_1)$.

FIG. 14 is a diagram for explaining a quantum teleportation protocol using the scissor-type quantum entanglement of FIG. 1, where (A) is an arrangement diagram of quantum bits and (B) is a connection diagram.

First, one of the quantum elements $SQE_0$, $SQE_1$ and $SQE_2$ is transformed by a Hadamard gate H into a superposition basis, which serves as a control bit and is applied as a control NOT gate for another quantum element. Concretely, the quantum bits $SQE_0$, $SQE_1$ and $SQE_2$ are arranged as illustrated in (A) of FIG. 14, and the quantum bits are connected by connections as illustrated in (B) of FIG. 14, realizing a quantum teleportation. Here, M designates a measuring gate. Finally, an X-rotational operation and a Z-rotational operation as illustrated by Formula 17 is performed upon $SQE_2$, thus realizing a quantum teleportation operation. Note that crz and crx are classical bits, and the transmission of information is carried out by a physical medium such as light.

[Formula 17]

$$X = \begin{pmatrix} 0 & 1 \\ 1 & 0 \end{pmatrix}$$

$$Z = \begin{pmatrix} 1 & 0 \\ 0 & -1 \end{pmatrix}$$

Figure 15:
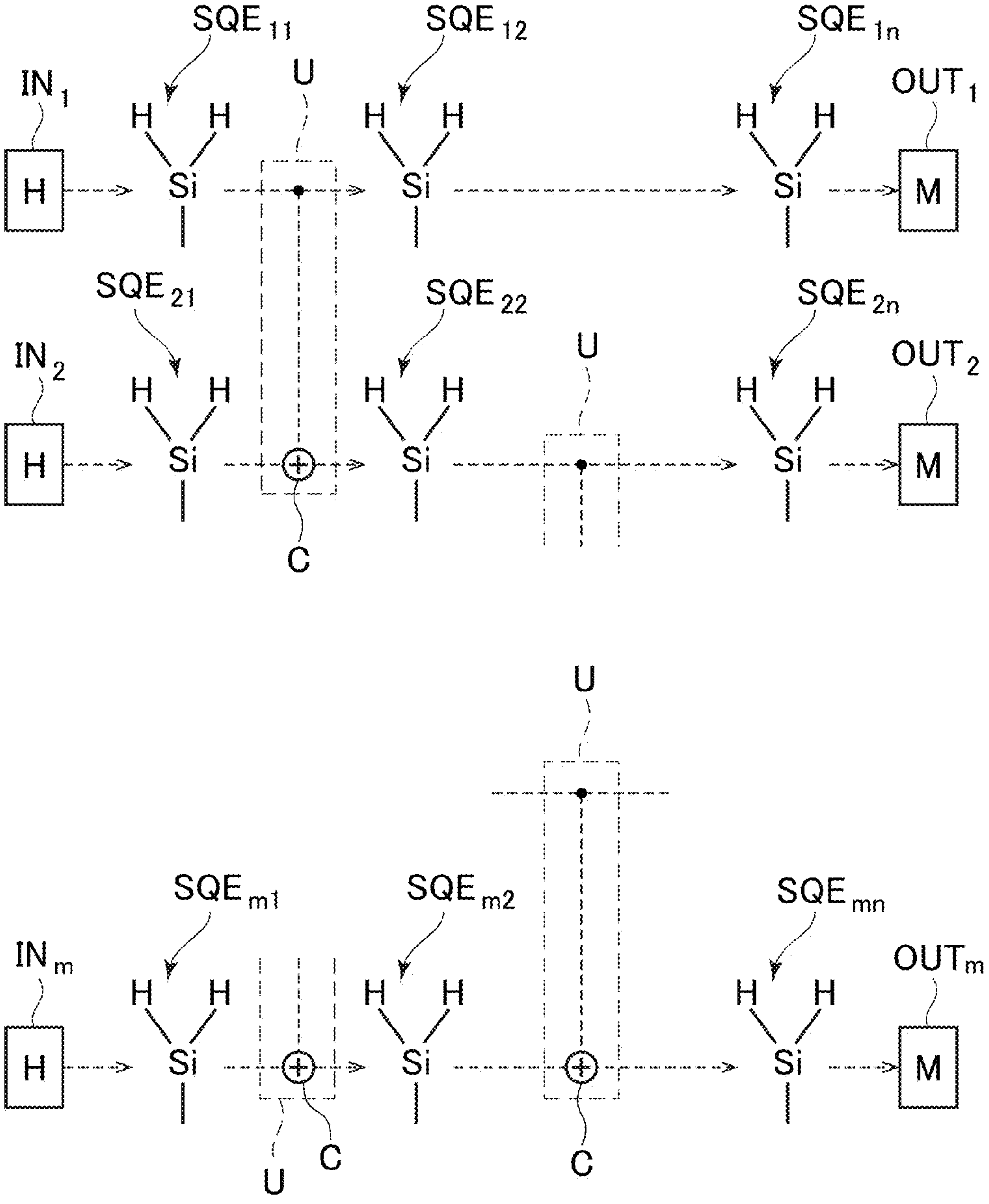
FIG. 15 A diagram illustrating a quantum computer using the scissor-type quantum entanglement device of FIG. 1.

FIG. 15 is a diagram illustrating a quantum computer using the scissor-type quantum entanglement device of FIG. 1.

In FIG. 15, provided between input gates (for example, Hadamard gates H) $IN_1$, $IN_2$, . . . $IN_m$ and output gates (for example, projection gates M) $OUT_1$, $OUT_2$, . . . , $OUT_n$ are m×n scissor-type quantum entanglement elements $SQE_{11}$, $SQE_{12}$, . . . , $SQE_{1n}$; $SQE_{21}$, $SQE_{22}$, . . . , $SQE_{2n}$; . . . ; $SQE_{m1}$, $SQE_{m2}$, . . . , $SQE_{mn}$ in a matrix, for example. Also, unitary gates U (for example, control NOT gates C or the like) for carrying out unitary operations are provided among the scissor-type entanglement elements, or the intervals between the quantum entanglement elements are resonance-excited, to perform unitary operation processing among the scissor-type quantum elements, thus realizing a quantum computer formed by a large number of scissor-type quantum entanglement elements SQE on a silicon substrate.

Note that, it is possible to individually change the eigen-vibrational states of the mXn scissor-type quantum entanglement elements $SQE_{11}$, $SQE_{12}$, . . . , $SQE_{1n}$; $SQE_{21}$, $SQE_{22}$, $SQE_{2n}$; . . . $SQE_{m1}$, $SQE_{m2}$, . . . , $SQE_{mn}$ by another method. In this case, the above-mentioned strain formation is carried out in the (100)-face monocrystalline silicon S2 in FIG. 4. That is, a sloped impurity addition or defect formation or an underlayer SiOwith a sloped thickness is provided to introduce a strain in the (100)-face monocrystalline silicon S2, thus resolving degenerated eigen-vibrational states. Therefore, it is possible to assign addresses in response to the laser frequency to arbitrary elements of the mXn scissor-type quantum entanglement elements SQE, thus realizing a quantum computer where the operation of the microscopically-arranged scissor-type quantum entanglement elements SQE can be macroscopically controlled.

FIG. 16 is a diagram illustrating a principle of a Bell measurement using the scissor-type quantum entanglement SQE of FIG. 1. 25 As illustrated in FIG. 16, in an ensemble of the scissor-type quantum entanglement elements SQE (in this case, consider $SQE_0$ and $SQE_1$), if no correlation occurs between the scissor-type quantum entanglement elements $SQE_1$ and $SQE_2$, a quantum mechanically direct product state can be considered in the scissor-type quantum entanglement elements. In this case, in the same way as in the above-mentioned generation of entangled photon pair, a quantum teleportation or a quantum swapping can occur in the physical state (vibrational state) of hydrogens between the scissor-type quantum entanglement elements $SQE_0$ and $SQE_1$. That is, when each of the scissor-type quantum entanglement elements $SQE_0$ and $SQE_1$ is interlocked with each other like H(1)-H(2) and H(3)-H(4), so that a direct product state with no correlation is formed (note that the pair of $SQE_0$ and $SQE_1$ need not be in close proximity to each other), a Bell state measurement is carried out with respect to the hydrogens H(2) and H(3). For example, when a Bell state measurement is realized by passing an electron between the hydrogens H(2) and H(3),to measure a deflection state of the electron, an interlock state of the remainder pair of the hydrogens H(1) and H(4) can be formed. When it is assumed that each of the ground states of the scissor-type quantum entanglement elements $SQE_0$ and $SQE_1$ has a singlet spin and there is no correlation between the scissor-type quantum entanglement elements $SQE_0$ and $SQE_1$, the wave function is represented by Formula 18.

$$|\Psi_{Qs}\rangle_{1234} = 1/2(|+1/2\rangle_1|-1/2\rangle_2 - |-1/2\rangle_1|+1/2\rangle_2)\otimes (|+1/2\rangle_3|-1/2\rangle_4 - |-1/2\rangle_3|+1/2\rangle_4) \quad \text{[Formula 18]}$$

Here, +½ represents an up spin and −½ represents a down spin. For this physical state, a Bell measurement as illustrated by Formula 19 or Formula 20 is carried out.

$$|\Psi_B^{\pm}\rangle_{23} = 1/\sqrt{2}(|+1/2\rangle_2|1/2\rangle_3 \pm |-1/2\rangle_2|+1/2\rangle_3) \text{ or} \quad \text{[Formula 19]}$$

$$|\Phi_B^{\pm}\rangle_{23} = 1/\sqrt{2}(|+1/2\rangle_2|+1/2\rangle_3 \pm |-1/2\rangle_2|-1/2\rangle_3) \quad \text{[Formula 20]}$$

The collapse of the physical state by the above-mentioned Bell measurement generates the same entangled state between the hydrogens H(1) and H(4) as described by the wave function of Formula 21.

$$|\Psi_{QS}\rangle_{1234} = 1/2(-|\Psi_B^{+}\rangle_{23}|\Psi_B^{+}\rangle_{14} - |\Psi_B\rangle_{23}|\Psi_B^{-}\rangle_{14} + |\Phi_B^{+}\rangle_{23}|\Phi_B^{+}\rangle_{14} + |\Phi_B\rangle_{23}|\Phi_B\rangle_{14}) \quad \text{[Formula 21]}$$

When this physical process is carried out in chain, the physical state of hydrogens can be through a quantum teleportation or a quantum entanglement swapping far away. Therefore, a quantum communication device or a quantum cryptograph device can be constructed by this principle.

In the above-mentioned embodiments, note that the quantum entanglement device can be constructed by a germanium crystal, a diamond crystal, an amorphous silicon, an amorphous germanium, an amorphous carbon, a silicon spherical nano crystal, a germanium spherical nano crystal, a carbon spherical nano crystal, a C60, a carbon nano tube, a graphene, a graphene, or a mixed crystal of silicon, germanium and carbon ($C_xSi_yGe_z$:$H_2$,x, y, z>0), in addition to a silicon crystal.

Also, in the above-mentioned embodiments, carbon element includes natural isotope of 1.11% C13, silicon element includes natural isotope of 4.7% Si29, and germanium element includes natural isotope of 7.7% Ge73. All of the natural isotopes have spins (C13 has a spin 1/2, Si29 has a spin 1/2, and Ge73 has a spin 9/2). Since these spins have a disturbing effect against the entangled operation of the scissor-type quantum entanglement element SQE, if the portion of the quantum entanglement element excluding the hydrogens is constructed by elements with no spins using separation of isotopes, thus realizing a more excellent quantum entanglement device.

Further, in the above-mentioned embodiments, hydrogen H1 includes 0.015% natural isotope deuterium H2 whose spin is 1. Therefore, in the quantum entanglement element SQE, if one hydrogen is replaced by a terminated deuterium, the requirement of anti-symmetric characteristic with respect to the exchange of the hydrogen wave functions is lost, so that no quantum entanglement is formed. Therefore, when the hydrogen portion of the scissor-type quantum entanglement element SQE is constructed by only hydrogens H1 using separation of isotopes, a more excellent quantum entanglement device can be obtained. In the above-mentioned embodiments, note that even when both of the hydrogen atoms 2 and 3 are constructed by deuterium H2, a scissor-type quantum entanglement element SQE can be realized.

In this case, deuterium atom is a Boson with spin 20 1, and therefore, the two deuterium atoms require that the total wave function is symmetric with respect to the exchange of the deuterium atom coordinates. That is, when an exchange operation P is performed upon the deuterium atoms coordinates $u_{2\rho}$ and $u_{3\rho}$, $P\xi_{1\rho}=\xi_{1\rho}$, $P\xi_{2\rho}=\xi_{2\rho}$, and $P\xi_{3\rho}=-\xi_{3\rho}$, and accordingly, the Hermite polynomial formula $Hn_{\nu\rho}(\xi_{\nu\rho})$ is an even function in a case where the quantum number $n_{\nu\rho}$ is an even number, and $Hn_{\nu\rho}(\xi_{\nu\rho})$ is an odd function in a case where the quantum number $n_{\nu\rho}$ is an odd number, so that in $Hn_{3\rho}(\xi_{3\rho})$, the odd-numbered energy level is converted by the exchange operation P like this: $P\phi_{odd}(\xi_{3\rho})=-\phi_{odd}(\xi_{3\rho})$.

Since the total wave function $\Psi n_{\nu\rho}(\xi_{\nu\rho})$ is required to be symmetric, an odd-numbered energy level spin state has an anti-symmetric spin state, and an even-numbered energy level spin state has a symmetric spin state.

As to the symmetry of the other coordinates than $\xi_{3\rho}$, since $P\phi n_{1\rho}(\xi_{1\rho})=\phi n_{1\rho}(\xi_{1\rho})$ and $P\phi n_{2\rho}(\xi_{2\rho})=\phi n_{2\rho}(\xi_{2\rho})$, so that no change occurs in the sign of the vibrational wave function. Therefore, the requirement of the symmetry of the total wave function $\Psi n_{\nu\rho}(\xi_{\nu\rho})$ is received by the term of the spin wave function, so that all the energy states of $n_{1\rho}$ and $n_{2\rho}$ become symmetric spin states.

Thus, even when the hydrogen atoms 2 and 3 are replaced by deuteriums whose nuclear spins are 1, a quantum entanglement device described by a symmetric nuclear spin state or an anti-symmetric nuclear spin state. In this quantum entanglement device, an energy of a scissor vibrational state (SC mode) is changed from a ground state to a first excited state whose energy is 81 meV, a 19 THz entangled photo pair can be generated. Note that an etching solution used in the manufacture of the quantum entanglement device by the deuteriums H2 includes deuterium instead of hydrogen.

A first advantage of the quantum entanglement device formed by two deuteriums H2 is that, since there are six symmetric nuclear spin states and three anti-symmetric nuclear states, many superposition states can be realized by one quantum entanglement element.

Also, a second advantage of the quantum entanglement device formed by two deuteriums H2 is that, since the atomic coupling between deuteriums and silicon element is solider than the atomic coupling between hydrogens and silicon element, deuterium atoms are not eliminated from silicon atom even at a high temperature state, which is more suitable in practical use.

Note that the present invention can be applied to any alterations within the obvious scope of the above-mentioned embodiments.

POSSIBILITY OF UTILIZATION IN INDUSTRY

In addition to a quantum entangled photon pair generating device, a quantum entangled photon pair laser device, a quantum computer, a quantum communication device and a quantum cryptography device, the present invention can be applied to a terahertz laser, a quantum light information communication, a stealth-type radar, a quantum wireless light source, a noninvasive/nondestructive testing device and the like.

DESCRIPTION OF THE SYMBOLS

S: silicon semiconductor
SQE, $SQE_{11}$, . . . : scissor-type quantum bit element
1: silicon atom
2, 3: hydrogen (proton)
S1: spherical nano monocrystalline silicon
S2: (100)-face monocrystalline silicon

The invention claimed is:

1. A quantum entanglement device comprising:
a group-IV semiconductor; and
a scissor-type quantum entanglement element consisting of at least one atom on a surface of said group-IV semiconductor and two hydrogen atoms or two deuterium atoms coupled to terminations of said atom,
wherein a surface of said group-IV semiconductor is a (100)-face, and
wherein a strain is introduced into said group-IV semiconductor to resolve degenerated energy levels of said scissor-type quantum entanglement element.

2. The quantum entanglement device as set forth in claim 1, further comprising a generating circuit for generating electric fields, magnetic fields or an electron beam for causing a normal vibration of said scissor-type quantum entanglement element to be in an excited state or in a ground state.

3. The quantum entanglement device as set forth in claim 1, further comprising a generating circuit for generating electric fields or magnetic fields for resolving degenerated energy levels of said scissor-type quantum entanglement element.

4. The quantum entanglement device as set forth in claim 1, further comprising an underlayer with a sloped or randomly-fluctuated impurity concentration or a defect concentration under said group-IV semiconductor, in order to introduce said strain thereinto.

5. The quantum entanglement device as set forth in claim 1, further comprising an underlayer with a sloped or randomly-fluctuated thickness under said group-IV semiconductor, in order to introduce said strain thereinto.

6. The quantum entanglement device as set forth in claim 5, wherein said underlayer comprises a silicon oxide layer.

7. The quantum entanglement device as set forth in claim 1, wherein said group-IV semiconductor comprises a silicon crystal, a germanium crystal, a diamond crystal, an amorphous silicon, an amorphous germanium, an amorphous carbon, a silicon spherical nano crystal, a germanium spherical nano crystal, a carbon spherical nano crystal, a C60, a carbon nano tube, a graphene, a graphane, or a mixed crystal of silicon, germanium and carbon ($C_xSi_yGe_z$: $H_2$,x,y,z>0).

8. The quantum entanglement device as set forth in claim 1, wherein said group-IV semiconductor comprises a silicon crystal, a germanium crystal, an amorphous silicon, an amorphous germanium, an amorphous carbon, a silicon spherical nano crystal, a germanium spherical nano crystal, a carbon spherical nano crystal, a C60, a carbon nano tube, a graphene, a graphane, or a mixed crystal of silicon, germanium and carbon ($C_xSi_yGe_z$: $H_2$,x,y,z>0), whose nuclear spins are 0.

9. A quantum entanglement device comprising:
a group-IV semiconductor; and
a scissor-type quantum entanglement element consisting of at least one atom on a surface of said group-IV semiconductor and two hydrogen atoms or two deuterium atoms coupled to terminations of said atom,
wherein said scissor-type quantum entanglement element has a triplet excited level between a singlet ground level and a singlet excited level, a difference between said singlet ground level and said triplet excited level being a same as a difference between said triplet excited level and said singlet excited level,
wherein an entangled photon pair is generated by a cascade transition from said singlet excited level via a spin angular moment m=+1 state of said triplet excited level to said singlet ground level and a cascade transition from said singlet excited level via a spin angular moment m=−1 state of said triplet excited level to said singlet ground level, and wherein a phonon pair further propagate in opposite directions to each other by cascade transitions of said singlet excited level via a spin angular momentum m=0 state of said triplet excited level to said singlet ground level.

10. A quantum entanglement device comprising:

a group-IV semiconductor; and a scissor-type quantum entanglement element consisting of at least one atom on a surface of said group-IV semiconductor and two hydrogen atoms or two deuterium atoms coupled to terminations of said atom, wherein said scissor-type quantum entanglement element has a triplet excited level between a singlet ground level and a singlet excited level, a difference between said singlet ground level and said triplet excited level being different from a difference between said triplet excited level and said singlet excited level by introducing a strain into said group-IV semiconductor, wherein an entangled photon pair is generated by a cascade transition from said singlet excited level via a spin angular moment m=+1 state of said triplet excited level to said singlet ground level and a cascade transition from said singlet excited level via a spin angular moment m=−1 state of said triplet excited level to said singlet ground level, and wherein a phonon pair further propagate in opposite directions to each other by cascade transitions of said singlet excited level via a spin angular momentum m=0 state of said triplet excited level to said singlet ground level.

11. A quantum entangled photon pair generating device comprising:

the quantum entanglement device as set forth in claim 1; and a pump light source for exciting said scissor-type quantum entanglement element, so that a photon pair generated from said scissor-type entanglement element can be in a quantum entangled state.

12. A quantum entangled photon pair laser device comprising:

a group-IV semiconductor;

multiple scissor-type quantum entanglement elements consisting of multiple atoms on a surface of said group-IV semiconductor and two hydrogen atoms or two deuterium atoms coupled to terminations of each of said atoms; and a pump light source for exciting said multiple scissor-type entanglement elements entirely, wherein said multiple scissor-type quantum entanglement elements are arranged in close proximity to each other, so that a photon pair is stimulatively emitted, wherein a surface of said group-IV semiconductor is a (100)-face, and wherein a strain is introduced into said group-IV semiconductor to resolve degenerated energy levels of said scissor-type quantum entanglement element.

13. A quantum computer comprising:

a group-IV semiconductor; and multiple scissor-type quantum entanglement elements consisting of multiple atoms on a surface of said group-IV semiconductor and two hydrogen atoms or two deuterium atoms coupled to terminations of each of said atoms, so that a unitary operation is carried out among said multiple scissor-type quantum entanglement elements, wherein a surface of said group-IV semiconductor is a (100)-face, and wherein a strain is introduced into said group-IV semiconductor to resolve degenerated energy levels of said scissor-type quantum entanglement element.

14. The quantum computer as set forth in claim 13, wherein said unitary operation is carried out by a rotational operation of each of said multiple scissor-type quantum entanglement elements and a spring interaction between said multiple scissor-type quantum entanglement elements.

15. The quantum computer as set forth in claim 14, wherein said rotational operation is carried out by using a light laser pulse.

16. A quantum communication device comprising:

a group-IV semiconductor; and multiple scissor-type quantum entanglement elements consisting of multiple atoms on a surface of said group-IV semiconductor and two hydrogen atoms or two deuterium atoms coupled to terminations of each of said atoms, so that a Bell measurement is carried out among said multiple scissor-type quantum entanglement elements, causing a quantum teleportation or a quantum entangled swapping, wherein a surface of said group-IV semiconductor is a (100)-face, and wherein a strain is introduced into said group-IV semiconductor to resolve degenerated energy levels of said scissor-type quantum entanglement element.

17. A quantum cryptography device comprising:

a group-IV semiconductor; and multiple scissor-type quantum entanglement elements consisting of multiple atoms on a surface of said group-IV semiconductor and two hydrogen atoms or two deuterium atoms coupled to terminations of each of said atoms, so that a Bell measurement is carried out among said multiple scissor-type quantum entanglement elements, causing a quantum teleportation or a quantum entangled swapping, wherein a surface of said group-IV semiconductor is a (100)-face, and wherein a strain is introduced into said group-IV semiconductor to resolve degenerated energy levels of said scissor-type quantum entanglement element.

* * * * *